US005859826A

United States Patent [19]
Ueno et al.

[11] Patent Number: 5,859,826
[45] Date of Patent: Jan. 12, 1999

[54] INFORMATION ENCODING METHOD AND APPARATUS, INFORMATION DECODING APPARATUS AND RECORDING MEDIUM

[75] Inventors: Masatoshi Ueno; Shinji Miyamori, both of Tokyo, Japan

[73] Assignee: Sony Corporation, Tokyo, Japan

[21] Appl. No.: 489,897

[22] Filed: Jun. 13, 1995

[30] Foreign Application Priority Data

Jun. 13, 1994 [JP] Japan .................................... 6-130653

[51] Int. Cl.[6] ........................................................ G11B 7/00

[52] U.S. Cl. ................................ 369/59; 369/48; 369/49; 369/275.3

[58] Field of Search ................................ 369/59, 47, 48, 369/49, 50, 54, 58, 32, 275.3; 360/48, 51, 53

[56] References Cited

U.S. PATENT DOCUMENTS

| | | | |
|---|---|---|---|
| 5,506,907 | 4/1996 | Ueno et al. | 381/18 |
| 5,519,681 | 5/1996 | Maeda et al. | 369/49 |
| 5,587,978 | 12/1996 | Endo et al. | 369/49 X |
| 5,590,108 | 12/1996 | Mitsuno et al. | 369/59 |
| 5,737,720 | 4/1998 | Miyamori et al. | 704/229 |

FOREIGN PATENT DOCUMENTS

WO 94/28633 12/1994 WIPO .

OTHER PUBLICATIONS

J. Rothweiler, "Polyphase Quardrature Filters—A New Subband Coding Technique," ICASSP Apr. 14–16, 1993, Boston, vol. 3 of 3, pp. 1280–1283.

R. Zelinski et al., "Adaptive Transform Coding of Speech Signals," IEEE Transactions on Acoustics, Speech & Signal Processing, vol. ASSP–25, No. 4 Aug. 1977, pp. 299–309.

R. Crochiere et al., "Digital Coding of Speech in Sub–Bands," The Bell System Technical Journal, vol. 55, No. 8, Oct. 1976, pp. 1069–1085.

J. Princen et al., "Subband/Transform Coding Using Filter Bank Designs Based on time Domain Aliasing Cancellation," ICASSP Apr. 6–9, 1987, vol. 4, pp. 2161–2164.

M. Kransner, "The Critical Band Coder—Digital Encoding of Speech Signals Based on the Perceptual Requirements of the Auditory System," IEEE Apr. 1980, vol. 1–3, pp. 327–331.

*Primary Examiner*—Muhammad N. Edun
*Attorney, Agent, or Firm*—Limbach & Limbach L.L.P.

[57] ABSTRACT

An encoding method and apparatus for encoding multichannel signals employed in, for example, a stereo system of a video disc player, a video tape recorder, a motion picture film picture system, or a so-called multi-surround acoustic system. Five channels, namely the center (C) channel, left (L) channel, right (R) channel, left surround (SL) channel and the right surround (SR) channel, for example, are handled in common depending upon frequency characteristic of digital audio signal and the targeted playback environment, and encoding is done while the combinations of the channels to be handled in common are altered. High compression may be achieved with the use of pre-existing encoding and decoding units by handling the channels in common without dependency upon the degree of correlation of multi-channel digital data.

28 Claims, 22 Drawing Sheets

```
audio_block (su)
{
    for(ch=0; ch<NChannel (acmod[suj]); ch++)
    {
        sflen [su] [ch]        LengthNum(frmsizecod[su])bits uimsf

        cplin [su] [ch]        1bit bslbf
        if (cplin [su] [ch]  ==1)
        {
            cp1_data (su, ch)
        }

        abs (su, ch)
    }

    for (cu=0;
```

$$cu < \sum_{p=0}^{3} \left( \left( \sum_{ch=0}^{NChannel(acmod[su])} cplchf[su]\,[ch]\,\delta 2^{P} \right) ?\,1:0 \right);$$

```
        cu++)
    {
        cpllen [su] [ch]        LengthNum(frmsizecod[su])bits uimsf
        cplst [su] [ch]         5bits uimsf
        cpled [su] [ch]         5bits uimsf
        acbs(su, ch)
        dummy = 0
    }

    if (lfeon [su]  = =  1 δδ  0<=acmod[su] <=23)
    {
        sflenlfa [su]        8bits uimsf
        abslfe (su,ch)
    }
}


cpl-data(su,ch)
{
    cplchf [su] [ch]         4bits bslbf
    cplcost [su] [ch]        5bits uimsf
    cplcoed [su] [ch]        5bits uimsf
    if (acmod[su] = = 1||  28<=acmod[su] <= 31)
    {


        phsflge [su] [ch]        1bit  bslbf
        if (phsflge[su] = = 1)
        {
            for (bd=cplcost[su] [ch]; bd<=cplcoed[su] [ch] ; bd++)
            {
                phsflg[su] [ch]  [bd]   1bit bslbf
            }
        }
    }
    cplco (su, ch)
    dummy = 0
}
```

FIG.20

INFORMATION ENCODING METHOD AND APPARATUS, INFORMATION DECODING APPARATUS AND RECORDING MEDIUM

BACKGROUND OF THE INVENTION

This invention relates to an encoding method and apparatus for encoding multi-channel signals employed in, for example, a stereo system of a video disc player, a video tape recorder, a motion picture film picture system, or a so-called multi-surround acoustic system. The invention also relates to a corresponding decoding method and apparatus, and a recording medium.

There are a variety of techniques of high efficiency encoding of audio signals or speech signals. An example of these techniques is transform coding in which a frame of digital signals representing the audio signal on the time axis is converted by an orthogonal transform into a block of spectral coefficients representing the audio signal on the frequency axis.

There is also known a sub-band coding in which the frequency band of the audio signal is divided by a filter bank into a plurality of sub-bands without forming the signal into frames along the time axis prior to coding. In addition, there is known a combination of sub-band coding and transform coding, in which digital signals representing the audio signal are divided into a plurality of frequency ranges by sub-band coding, and transform coding is applied to each of the frequency ranges.

Among the filters for dividing a frequency spectrum into a plurality of equal-width frequency ranges include the quadrature mirror filter (QMF) as discussed in R.E. Crochiere, Digital Coding of Speech in Sub-bands, 55 Bell Syst. Tech J. No. 8 (1976). With such QMF filter, the frequency spectrum of the signal is divided into two equal-width bands. With the QMF, aliasing is not produced when the frequency bands resulting from the division are subsequently combined together. In "Polyphase Quadrature Filters-A New Subband Coding Technique", Joseph H. Rothweiler ICASSP 83, Boston, there is shown a technique of dividing the frequency spectrum of the signal into equal-width frequency bands. With the present polyphase QMF, the frequency spectrum of the signals can be divided at a time into plural equal-width frequency bands.

There is also known a technique of orthogonal transform including dividing the digital input audio signal into frames of a predetermined time duration, and processing the resulting frames using a discrete Fourier transform (DFT), discrete cosine transform (DCT) and modified DCT (MDCT) for converting the signal from the time axis to the frequency axis. Discussions on MDCT may be found in J. P. Princen and A. B. Bradley, "Subband Transform Coding Using Filter Bank Based on Time Domain Aliasing Cancellation", ICASSP 1987.

By quantizing the signals divided on the band basis by the filter or orthogonal transform, it becomes possible to control the band subjected to quantization noise and psychoacoustically more efficient coding may be performed by utilizing the so-called masking effects. If the signal components are normalized from band to band with the maximum value of the absolute values of the signal components, it becomes possible to effect more efficient coding.

In a technique of quantizing the spectral coefficients resulting from an orthogonal transform, it is known to use sub bands that take advantage of the psychoacoustic characteristics of the human auditory system. That is, spectral coefficients representing an audio signal on the frequency axis may be divided into a plurality of critical frequency bands. The width of the critical bands increase with increasing frequency. Normally, about 25 critical bands are used to cover the audio frequency spectrum of 0 Hz to 20 kHz. In such a quantizing system, bits are adoptively allocated among the various critical bands. For example, when applying adaptive bit allocation to the spectral coefficient data resulting from MDCT, the spectral coefficient data generated by the MDCT within each of the critical bands is quantized using an adoptively allocated number of bits.

There are presently known the following two bit allocation techniques. For example, in IEEE Transactions of Acoustics, Speech and Signal Processing, vol. ASSP-25, No. 4, August 1977, bit allocation is carried out on the basis of the amplitude of the signal in each frequency band.

In the bit allocation technique described in M. A. Krassner, The Critical Band Encoder- Digital Encoding of the Perceptual Requirements of the Auditory System, ICASSP 1980, the psychoacoustic masking mechanism is used to determine a fixed bit allocation that produces the necessary signal-to-noise ratio for each frequency band.

In the high-efficiency encoding system for audio signals making use of the above-mentioned subband coding or the like, such a system in which audio data is compressed to about ⅕ by taking advantage of the characteristics of the human hearing sense. In a system known as ATRAC (Adaptive Transform Acoustic Coding, a trademark of Sony Corporation) used, for example, in the MiniDisc (trademark of Sony Corporation), a magneto-optical disc 64 mm in diameter is utilized, as well as an efficient encoding system of compressing audio data so that a quantity of data recorded on such magneto-optical disk becomes equal to about ⅕ of the original data.

In a stereo or multi-surround audio system for a motion picture film motion picture system, high definition television, video tape recorder or a video disc player, as well as the common audio equipment, the trend is toward handling audio or speech signals of a plurality of channels, e.g., four to eight, channels. It is therefore desired in this case to reduce the bit rate by way of high efficiency encoding.

Most compelling, when recording digital audio signals of eight channels, namely left channel, left center channel, center channel, right center channel, right channel, left surround channel, right surround channel and sub-woofer channel, on a motion picture film, a necessity arises for high efficiency encoding of reducing the bit rate. That is, an area sufficient to record eight channels of 16-bit linear-quantized audio data at a sampling frequency of 44.1 kHz is difficult to hold on the motion picture film, thus necessitating compression of the audio data.

The channels of the eight channel data recorded on the motion picture film are associated with a left speaker, a left center speaker, a center speaker, a right center speaker, a right speaker, a surround left speaker, a surround right speaker, and a sub-woofer speaker, which are disposed on the screen side where a picture reproduced from the picture recording area of motion picture films are projected by a projector. The center speaker is disposed at the center on the screen side, and serves to output sound reproduced from audio data of the center channel. The center speaker output is the most important reproduced sound, such as speech of an actor.

The sub-woofer speaker serves to output sound reproduced from audio data of a sub-woofer channel. The sub-woofer speaker effectively outputs sound which is sensed as vibrations rather than sound in low frequency range, such as, for example, the sound of an explosion. This is frequently used effectively in scenes of an explosion. The left speaker and the right speaker are disposed on left and right sides of the screen, and serve to output reproduced sound by audio data of left channel and reproduced sound by audio data of right channel, respectively. These left and right speakers provide a stereo sound effect. The left center speaker is disposed between the left speaker and the center speaker, and the right center speaker is disposed between the center speaker and the right speaker. The left center speaker outputs sound reproduced from audio data of the left channel, and the right center speaker outputs sound reproduced from audio data of the right center channel. These left and right center speakers perform auxiliary roles of the left and right speakers, respectively. Most important, in movie theaters having large screen and large number of persons to be admitted, there is the drawback that localization of sound image becomes unstable in dependency upon seat positions. However, the above-mentioned left and right center speakers are added to thereby exhibit effects in creating more realistic localization of the sound image.

In addition, the surround left and right speakers are disposed so as to surround the spectator's seats. These surround left and right speakers serve to respectively output sound reproduced sound from audio data of the surround left channel and sound reproduced from audio data of the surround right channel, and provide the effect of reverberation or an impression of being surrounded by hand clapping or a shout of joy. Thus it is possible to create sound images in more three-dimensional manner.

In addition, since defects are apt to take place on the surface of a motion picture film, if digital data is recorded as it is, data is frequently missing. Such a recording system cannot be employed from a practical point of view. For this reason, the abilities of error correcting code is very important.

Accordingly, with respect to data compression, it is necessary to carry out compression processing to such a degree that recording in the recording area on the film takes into consideration the bits added for an error correcting code.

In view of this consideration, in the method of compression processing of eight channels of digital audio data as described above, there is applied the high efficiency encoding system, such as the ATRAC system, which achieves high quality comparable to that of a CD by carrying out optimum bit allocation which takes into account the above-mentioned characteristics of the human hearing sense as described above, while compressing the 16-bit digital audio data to about ⅕ with the sampling frequency of 44.1 kHz.

However, the high efficiency encoding system for compressing the digital audio data to about ⅕ is the encoding system for a single channel. If this system is employed for encoding multi-channel audio data, it is not possible to achieve effective data encoding employing data interdependency among different channels or elements such as data or format characteristics of the respective channels.

On the other hand, since the directional perception of the human hearing sense tends to be unstable with respect to sound in the high frequency range, there is known a method of encoding data in common among respective channels in the high frequency range and to record the data thus encoded in common for diminishing the recording area. However, since the level difference can be perceived, even though the direction feeling of the sound becomes indefinite, it frequently occurs that changes in a sound field can be perceived by the hearer during multi-channel reproduction, particularly if the correlation among different channels is low.

SUMMARY OF THE INVENTION

In view of the foregoing, it is an object of the present invention to provide a signal encoding method and apparatus, a signal decoding method and apparatus and a recording medium, in which high compression may be achieved in multi-channel signal encoding using pre-existing encoding and decoding units without dependency upon the correlation of the digital data among the respective channels.

According to one aspect, the present invention provides an encoding method for encoding digital signals of plural channels and outputting the encoded digital signals and the parameter information for encoding, including the steps of handling the digital signals of at least a part of the channels in common to form a common digital signal, altering the combinations of channels handled in common depending upon frequency characteristics of the digital signals or the targeted playback environment, and encoding the common digital signal. The present invention also provides an encoding apparatus for carrying out the encoding method.

According to another aspect, the present invention provides a decoding apparatus for decoding encoded digital signals using parameters for encoding, which encoded digital signals are such signals in which part or all of digital signals of plural channels are handled as one or more common signals. The combinations of channels for common handling can be altered in dependence upon frequency characteristics of the digital signals and the targeted playback environment. The decoding apparatus includes decoding means for decoding the common signals, distributing means for distributing the decoded common signals in dependence upon the combinations of common handling, and decoding means for restoring the decoded common signals of plural channels.

According to still another aspect, the present invention provides a recording medium having recorded thereon such a signal in which part or all of digital signals of plural channels are handled as one or more common signals and encoded, the parameter information specifying the combinations of channels to be handled in common, an encoded signal other than the common signals and the parameter information for encoding, in addition to the parameter information concerning the encoding. The combinations of channels for common handling are altered in dependence upon frequency characteristics of the digital signals and the targeted playback environment.

With the encoding method and apparatus of the present invention, the digital signals of at least a part of plural channels are handled as common signals and encoded for raising the compression ratio. The combinations of channels to be handled in common or the processing method for handling the signals in common are altered in dependence upon the targeted or recommended playback environment for suppressing changes in the sound field otherwise caused by common handling if the digital signals are audio signals.

It is possible with the encoding method and apparatus of the present invention to evade unstable sound field due to sudden changes in the processing method of handling of common data or in the combinations of channels to be handled in common.

With the decoding apparatus of the present invention, digital signals of plural channels are decoded from at least one signal handled in common, and the processing method for handling the common signals is altered in dependence upon the recommended playback environment for the encoded signals for suppressing changes in the sound field produced by common handling if the digital signals are audio signals.

With the recording medium, such as an optical disc or a motion picture film, of the present invention, having recorded thereon the signals encoded in accordance with the encoding method and apparatus of the present invention, it becomes possible to provide a stabilized sound field.

BRIEF DESCRIPTION OF THE DRAWINGS

FIG. 20 illustrates header data of an encoded bitstream for respective channels.

DESCRIPTION OF THE PREFERRED EMBODIMENTS

Figure 1:
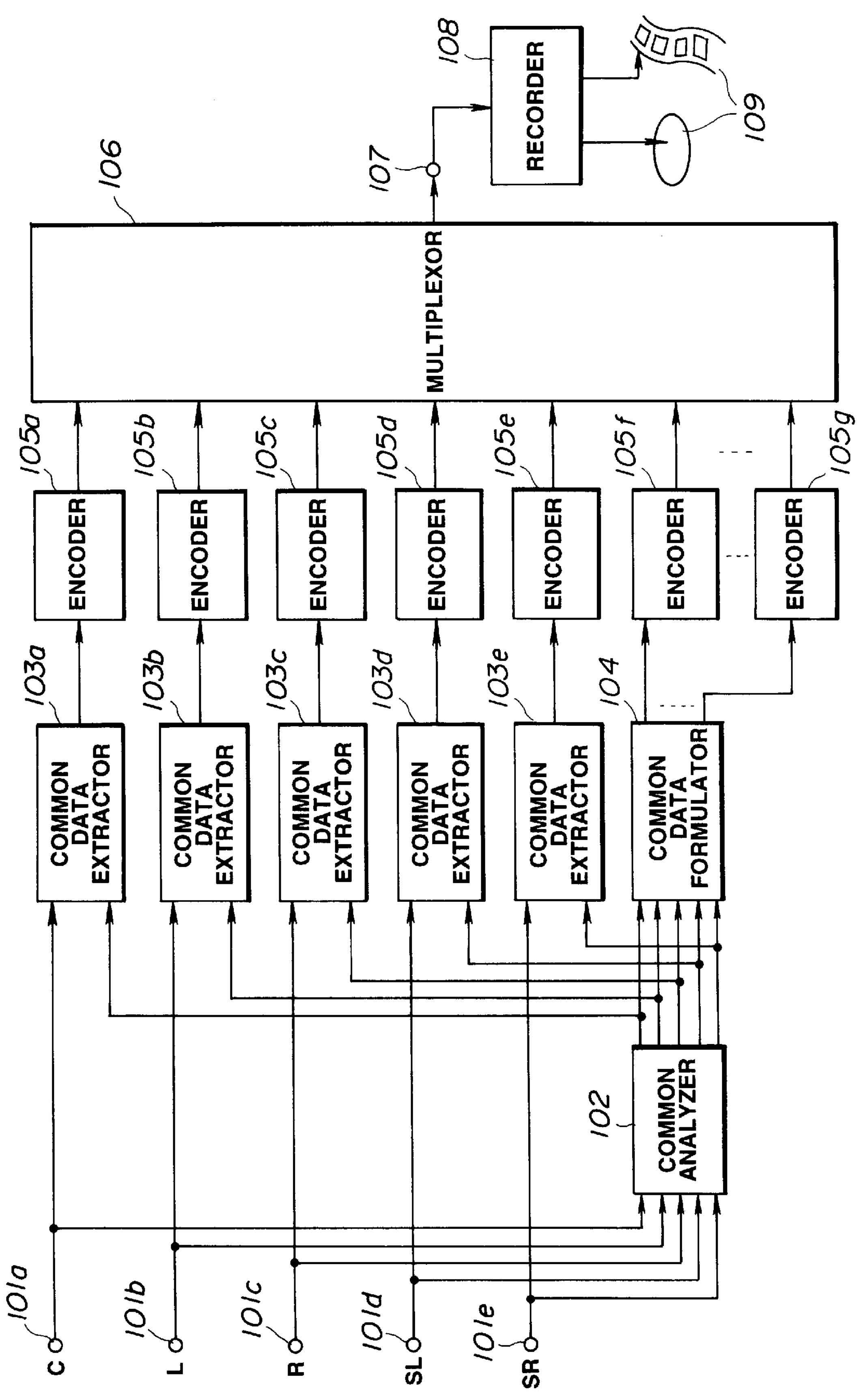
FIG. 1 is a schematic block circuit diagram showing a configuration of a multi-channel audio data encoding apparatus embodying the present invention.

Referring to the drawings, illustrative embodiments of the present invention will be explained in detail.

FIG. 1 shows a configuration of an encoder (encoding apparatus) to which the encoding method of the resent invention is applied. The encoder of the present embodiment is configured to implement multi-channel encoding using a plurality of single-channel encoding units, such as encoding units of the above-mentioned encoding units of the ATRAC system.

In further detail, the encoder of the present embodiment is configured to encode digital audio signals of plural channels and to output the parameter information for encoding along with encoded digital audio signals. The encoder includes a common analyzer 102, a common data formulator 104 and encoding units 105*f* to 105*g* as means for handling part or all of the digital audio signals of plural channels as one or plural common signals, modifying channel combinations carrying out the common handling in dependence upon frequency characteristics of the digital audio signals and the targeted playback environment and encoding the common signals.

Figure 2:
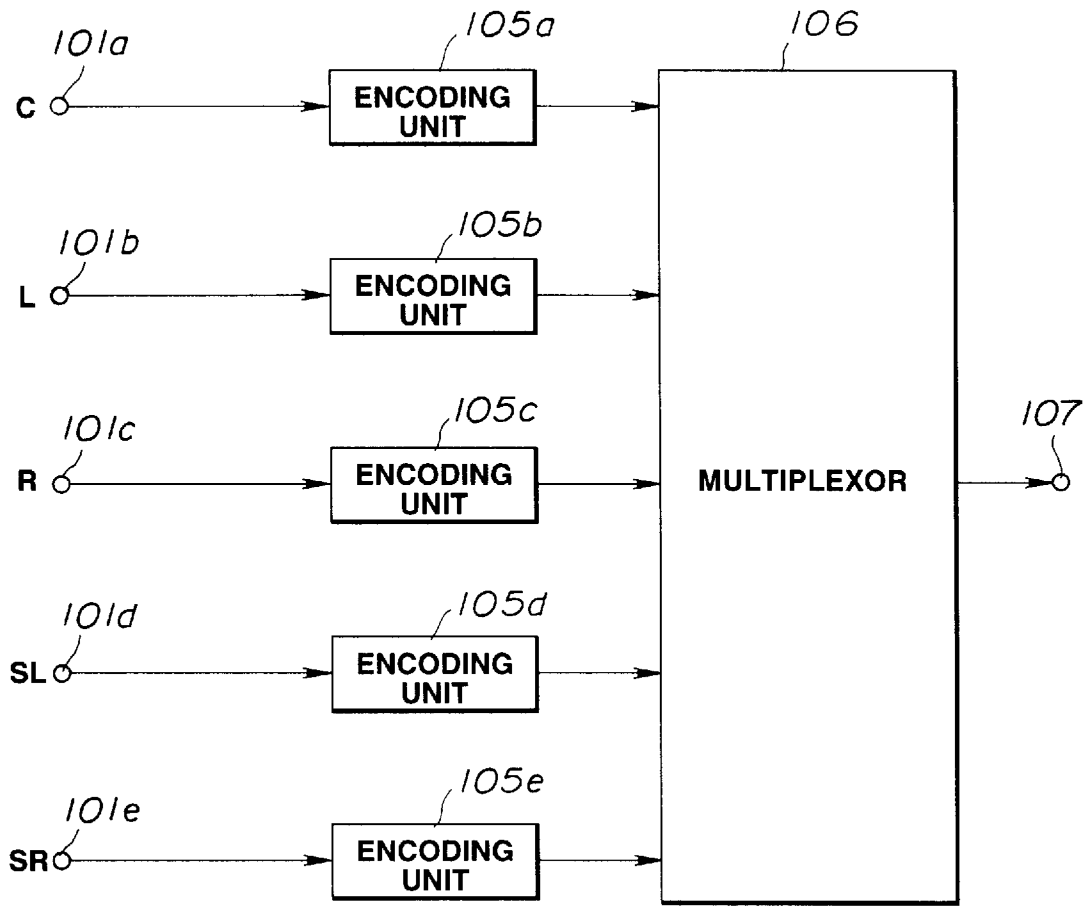
FIG.2 PRIOR ART
FIG. 2 is a block circuit diagram showing a configuration of a multi-channel audio data encoding apparatus not employing the present invention.

FIG. 2 shows, for comparison with the encoder of the embodiment of the present invention, a configuration of a multi-channel encoder effecting channel-based compression encoding, that is a multi-channel encoder not employing the present invention. For facilitating the understanding, similar portions of FIGS. 1 and 2 are represented by the same reference numerals and the corresponding description is omitted.

In the embodiment of FIG. 1, explanation is made using audio data of five channels, that is a center (C) channel, a left (L) channel, a right M channel, a left surround (SL) channel and a right surround (SR) channel. A 5-1 channel can be constituted by adding a sub-woofer channel for ultra-low frequency. The configuration of FIG. 2 is explained before explanation of FIG. 1. Audio data of the center (C) channel, left (L) channel, right (R) channel, left surround (SL) channel and the right surround (SR) channel, fed via input terminals 101*a* to 101*e*, are routed to single-channel encoding units 105*a* to 105*e*, respectively. These encoding units 105*a* to 105*e* carry out encoding as later explained. The resulting encoded data are fed to a multiplexor 106 where the encoded data of the respective channels are multiplexed into a single bitstream which is outputted at an output terminal 107.

The bitstream from the output terminal 107 is recorded on a recording medium 109, such as an optical disc or a cinema film, by a recorder 108 which effects processing such as appendage of error correction codes or modulation. Alternatively, the bitstream is transmitted over a cable or by radio transmission by a pre-set communication device.

With the encoder of the embodiment of the present invention, audio data of the center (C) channel, left (L) channel, right (R) channel, left surround (SL) channel and the right surround (SR) channel, supplied via the input terminals 101*a* to 101*e*, are entered to an analyzer for common handling 102. The common analyzer 102 selects a technique for common handling effective among the different channels, and a range to be handled in common, and selectively outputs only the portion of the audio data of the respective channels that are to be handled in common. If common handling is not performed, nothing is outputted.

Outputs of the analyzer for common handling 102 are entered to common data extractors 103*a* to 103*e* of associated channels. The common data extractors extract common portions from the original audio data from channel to channel and transmit only remaining portions to the encoders 105*a* to 105*e*. The internal configuration of the encoding units 105*a* to 105*e* is substantially equivalent to that of the encoding units of FIG. 2 and hence the detailed description is omitted.

An output of the analyzer for common handling 102 is also routed to a common data formulator 104 which collects common data of the respective channels to form one or plural common data which is outputted.

The encoding units 105*a* to 105*e* encode outputs of the common data extractors 103*a* to 103*e*, while the encoding units 105*f* and 105*g* encode one or plural common data outputted from the common data formulator 104.

These encoding units 105*a* to 105*g* output the parameter information of common handling used for encoding, along with respective encoded data, to the multiplexor 106, which multiplexes outputs of the encoding units 105*a* to 105*g* to form a bitstream which is outputted at an output terminal 107.

The bitstream from the output terminal 107 is recorded on recording medium 109, such as an optical disc or a motion picture film, by recording unit 108 which effects processing such as appendage of error correction codes or modulation. Alternatively, the bitstream is transmitted over a cable or by radio transmission by a pre-set communication device.

Figure 3:
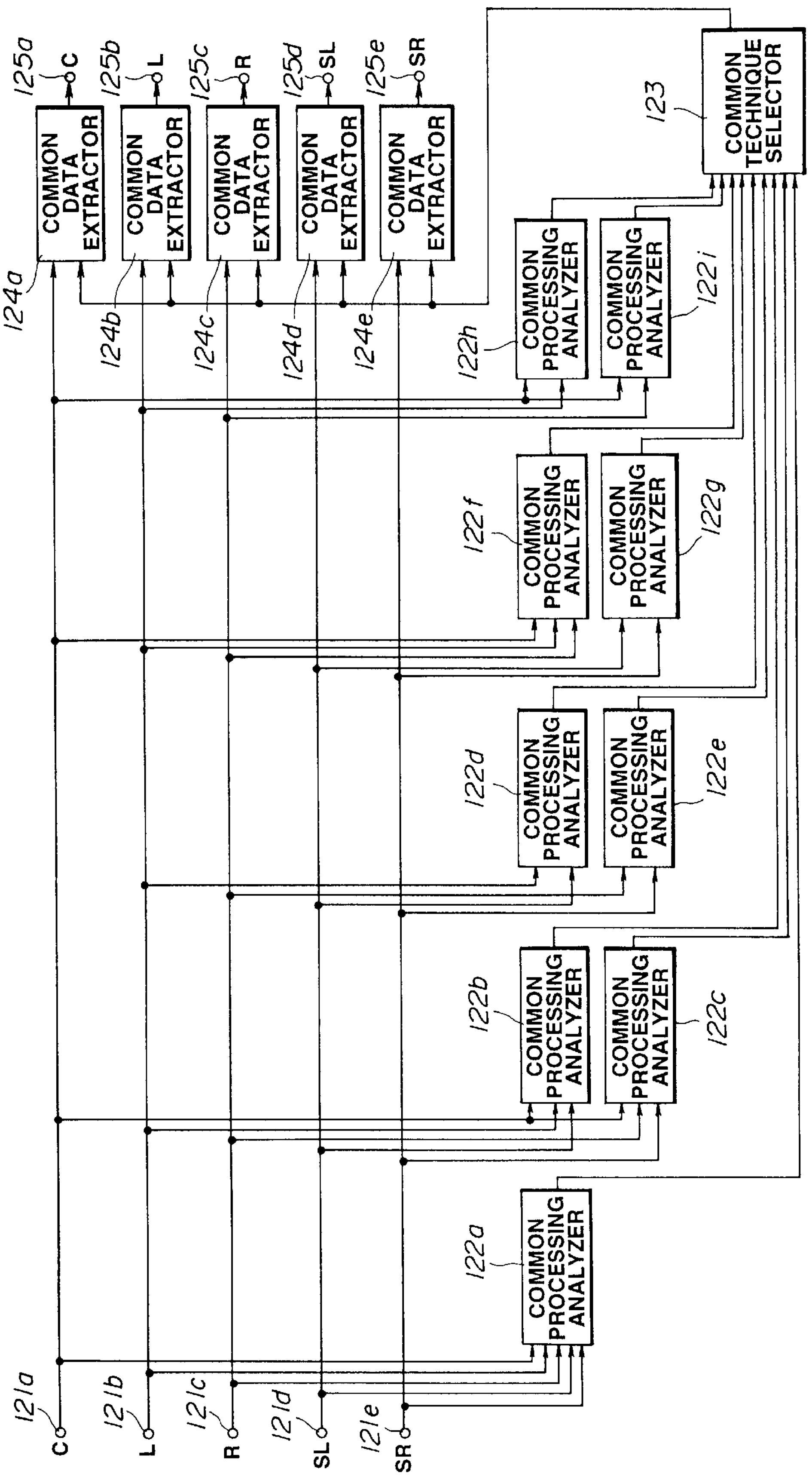
FIG. 3 is a block circuit diagram showing a configuration of a common handling analyzer of the encoding apparatus embodying the present invention.

FIG. 3 shows an internal configuration of the common analyzer 102.

Referring to FIG. 3, the audio data of the center (C) channel, left (L) channel, right (R) channel, left surround (SL) channel and the right surround (SR) channel, supplied via the input terminals 121*a* to 121*e*, are selectively transmitted to analyzers for common handling 122*a* to 122*i*, where it is analyzed whether the use of the techniques for common handling is effective, and the results of analyses are outputted. The analyzers for common handling 122*a* to 122*i* are associated with respective selections (combinations) of the channels to be handled in common.

Outputs of the analyzers for common handling 122*a* to 122*i* are all sent to common technique selector 123. The common technique selector 123 preferentially selects a system which allows the handling of as many channels as possible. That is, an output of that of common processing analyzers common handling 122*a* to 122*i* which is disposed more towards left in FIG. 3. Thus the common technique selector 123 determines the technique for handling in common and the range of handling in common in order to output the results of selection.

The common data extractors 124*a* to 124*e* extract only the portions of data of the respective channels of the input terminals 121*a* to 12*e*, based upon data to be handled in common, as specified by the common technique selector 123, and output the extracted data at associated output terminals 125*a* to 125*e*. Data on common handling, that is the parameter information for handling in common, as supplied from the common technique selector 123, is outputted to common data extractors 124*a* mto 124*e* for extracting commonly handled data as pre-set frames on the sound frame basis.

Taking an example of five channels, namely the center (C) channel, left (L) channel, right (R) channel, left surround (SL) channel and the right surround (SR) channel, the sorts of selection of channels to be handled in common will be explained with reference to FIGS. 4A to 4E.

Figure 4A:
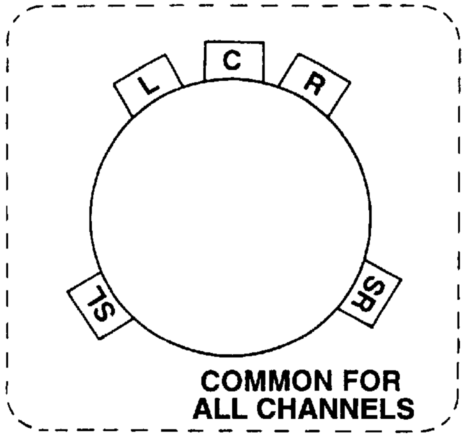
FIGS. 4A–4E illustrate different sorts of selection of channels for common handling embodying the present invention.

FIG. 4A indicates that all channels are to be handled in common. This corresponds to the analyzer 122*a* which analyzes effectiveness of the techniques for handling in common.

Figure 4B:
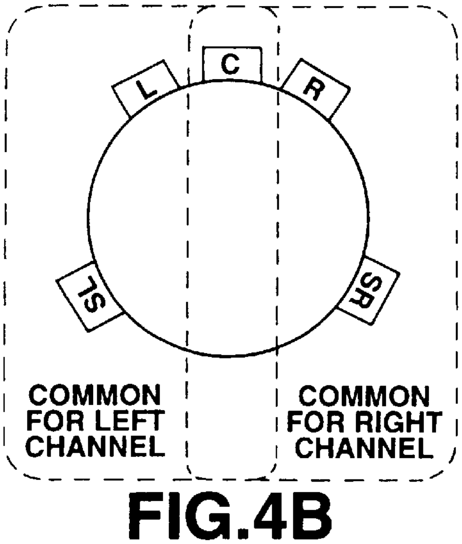

FIG. 4B indicates that three channels, namely the center (C) channel, left (L) channel and the left surround (SL) channel are to be handled in common as the left-route channel, while the three channels, namely the center (C) channel, the right (R) channel and the right surround (SR) channels, are to be handled in common as right-route channels. These correspond to the analyzers for common handling 122*b* and the analyzers for common handling 122*c*, respectively.

Figure 4C:
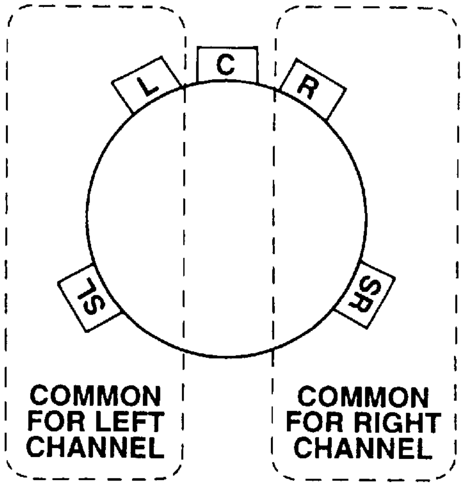

FIG. 4C indicates that two channels, namely the center (C) channel and the left surround (SL) channel, are to be handled in common as the left-route channel, while two channels, namely the right (R) channel and the right surround (SR) channels, are to be handled in common as right-route channels. These correspond to the analyzers for common handling 122*d* and the analyzers for common handling 122*e*, respectively.

Figure 4D:
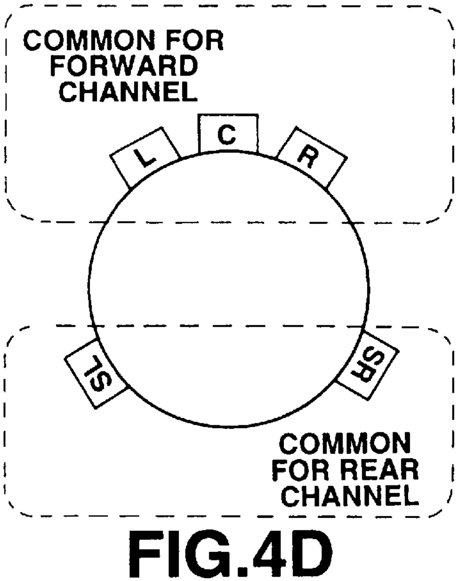

FIG. 4D indicates that three channels, namely the center (C) channel, left channel (L) and the right (R) channel are to be handled in common as the forward-route channel, while two channels, namely the left surround (SL) channel and the right surround (SR) channel, are to be handled in common as backward-route channels. These correspond to the analyzers for common handling 122*f* and the analyzers for common handling 122*g*, respectively.

Figure 4E:
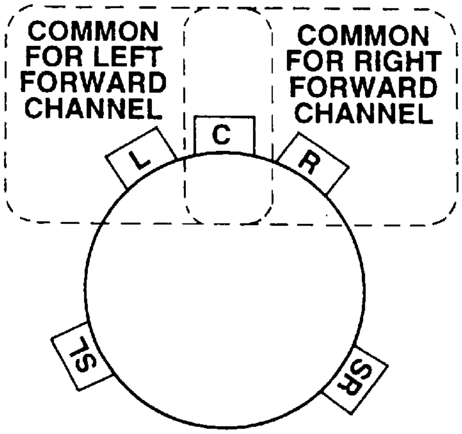

FIG. 4E indicates that two channels, namely the center (C) channel and the left channel (L), are to be handled in common as the left forward route channel, while two channels. namely the center (C) channel and the left (L) channel, are to be handled in common as right forward route channels. These correspond to the analyzers for common handling 122*h* and the analyzers for common handling 122*i*, respectively.

Thus the encoder of the embodiment illustrated allows the reduction of the alienated hearing sensation caused by handling in common not only by selecting the channels to be handled in common which exploit data characteristics, but also by utilizing combinations of common handling which take advantage of features of a targeted playback environment. Although the combinations of handling in common shown in FIGS. 4A–4E are the best of those thought to be effective, any other combinations may be envisaged within the scope of the present invention.

Figure 5:
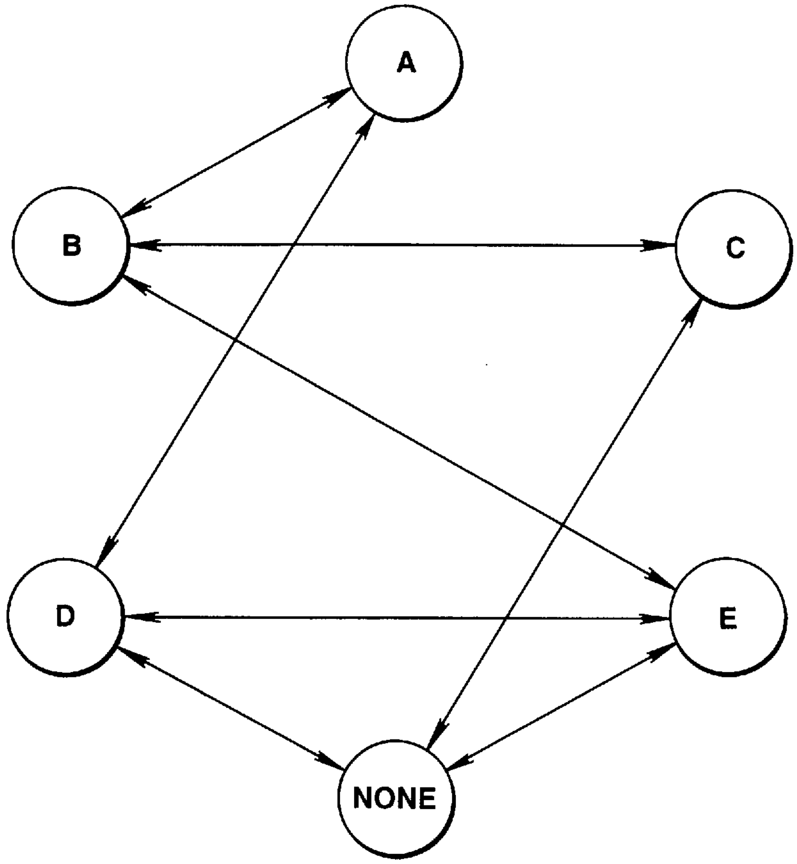
FIG. 5 illustrates changes between surround frames of the channel for common handling.

The techniques for handling in common, shown in FIG. 4, may also be changed between sound frames as pre-set frames by the relation indicated by arrows shown in FIG. 5. That is, A to E in FIG. 5 correspond to A to E in FIG. 4, specifying that the techniques connected by arrows are changed from one sound frame to another. If, for example, the state devoid of a common channel (NONE) is selected in a sound frame, the techniques C, D or E can be selected at the next sound frame. If the technique D is selected, the technique A, E or NONE becomes selectable at the next following sound frame.

Conversely, the absence of an arrow from NONE to A or B indicates that direct selection of A or B as the next sound frame from the sound frame NONE (indicating that the absence of the common channel is inhibited). Thus, sound frame localization may be improved by utilizing a pre-set relation in the selection of the technique for common handling among sound frames.

As a technique for common handling, it is possible to utilize plural techniques of common handling to exist within one sound frame.

It may be contemplated to analyze audio signals of respective channels from one specific frequency band to another and to select the technique of common handling from one specific frequency band to another. That is, such an artifice may be used in which frequency converting means for converting time-domain signals into frequency-domain signals are provided within the common processing analyzers 122*a* to 122*e* or at an upstream side of the input terminals 121*a* to 122*e* and the resulting frequency-domain signals are analyzed from one specific frequency band to another to select the technique of common handling based upon the results of analyses. This enables a processing in which common handling is realized by using the technique of common handling of all channels for the high frequency range as shown in FIG. 4A and the technique of common handling of left and right channels for the mid frequency range as shown in FIG. 4C, thereby realizing more effective common handling.

In addition, more effective common handling may be achieved by common handling of e.g., left (L) channel and left surround (SL) channel and-by common handling of e.g., right (R) channel and right surround (SR) channel within the same specified frequency range of the same sound frame.

In addition, assuming that there exist two channels each having a double power in the center channel (C), this channel may be divided and the signals of the two channels may be recorded in each of the left and left surround channels handled in common and the right and right surround channels handled in common for raising the efficiency of common handling. Furthermore, the encoding/decoding technique of separating the signal component into tonal components and noise components and encoding/decoding them as proposed by the present Assignee in our previous International Application No. PCT/JP94/00880, date of international application May 31, 1994, may be used so that all channels are handled in common (as in FIG. 4A) for the noise components and the left and right channels are handled in common for the tonal components.

Figure 6:
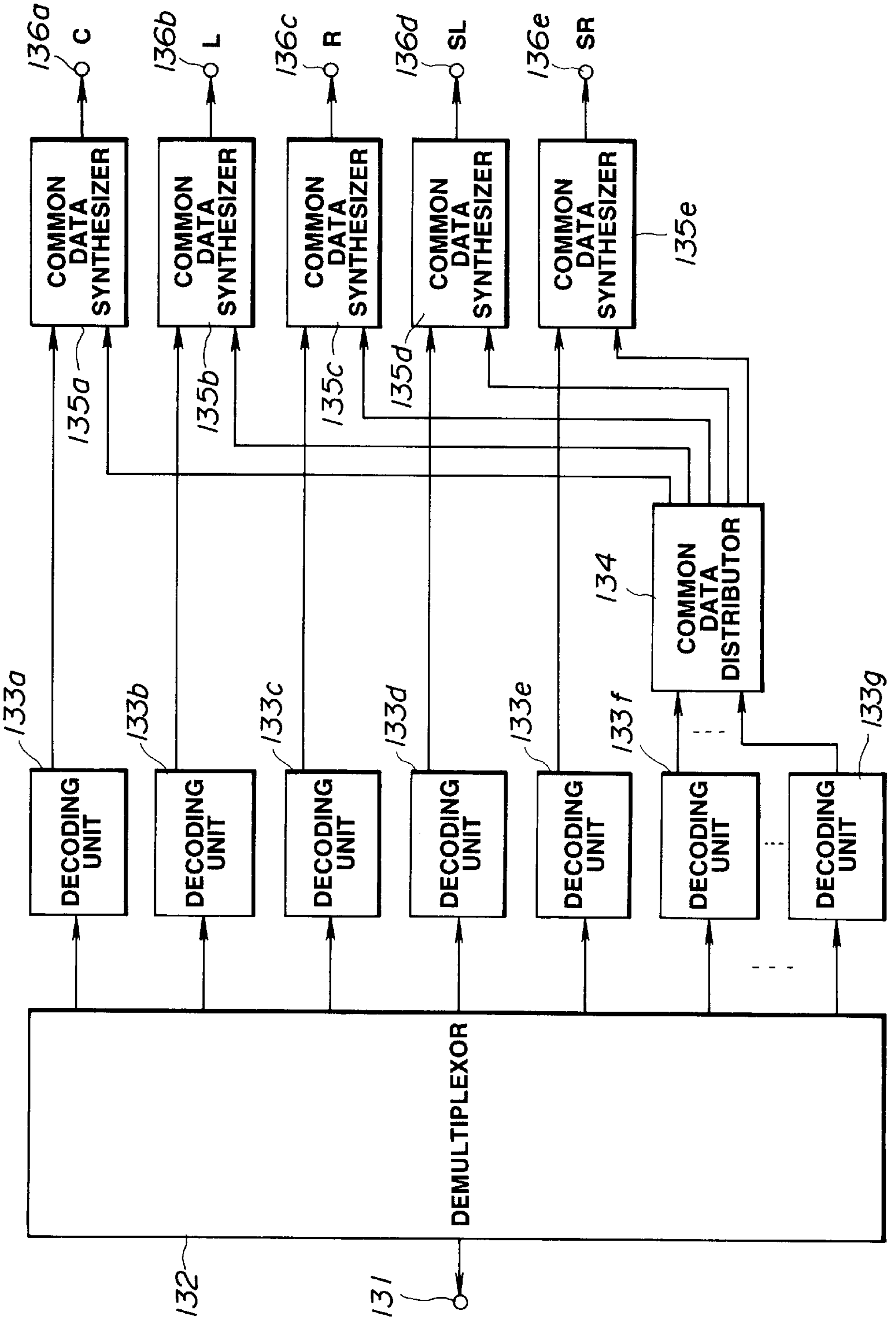
FIG. 6 is a schematic block circuit diagram of a multi-channel audio signal decoding apparatus embodying the present invention.

FIG. 6 shows a configuration of a decoder (decoding apparatus) for carrying out the decoding method of the present invention. The decoder of the embodiment illustrated is a decoder in which multi-channel decoding is implemented using plural single-channel decoding units, such as the decoding units corresponding to the above-mentioned ATRAC system.

The decoder of the embodiment illustrated is a decoder in which part or all of the digital audio signals of plural channels are handled as signals of one or more channels handled in common, and in which encoded digital audio signals of plural channels, including signals for which the combinations of the channels handled in common have been changed responsive to the targeted playback environment and frequency characteristics of the digital audio signals, are decoded using the parameter information of common handling used for encoding, as shown in FIG. 6. The decoder includes decoding units 133*f* and 133*g*, a common data distributor 134 and common data synthesizers 135*a* to 135*e*. The decoding units decode the signals handled in common, distribute the signals decoded and handled in common among plural channels responsive to the parameter information for common handling and synthesize the signals with the signals of respective channels decoded but not handled in common.

Figure 7:
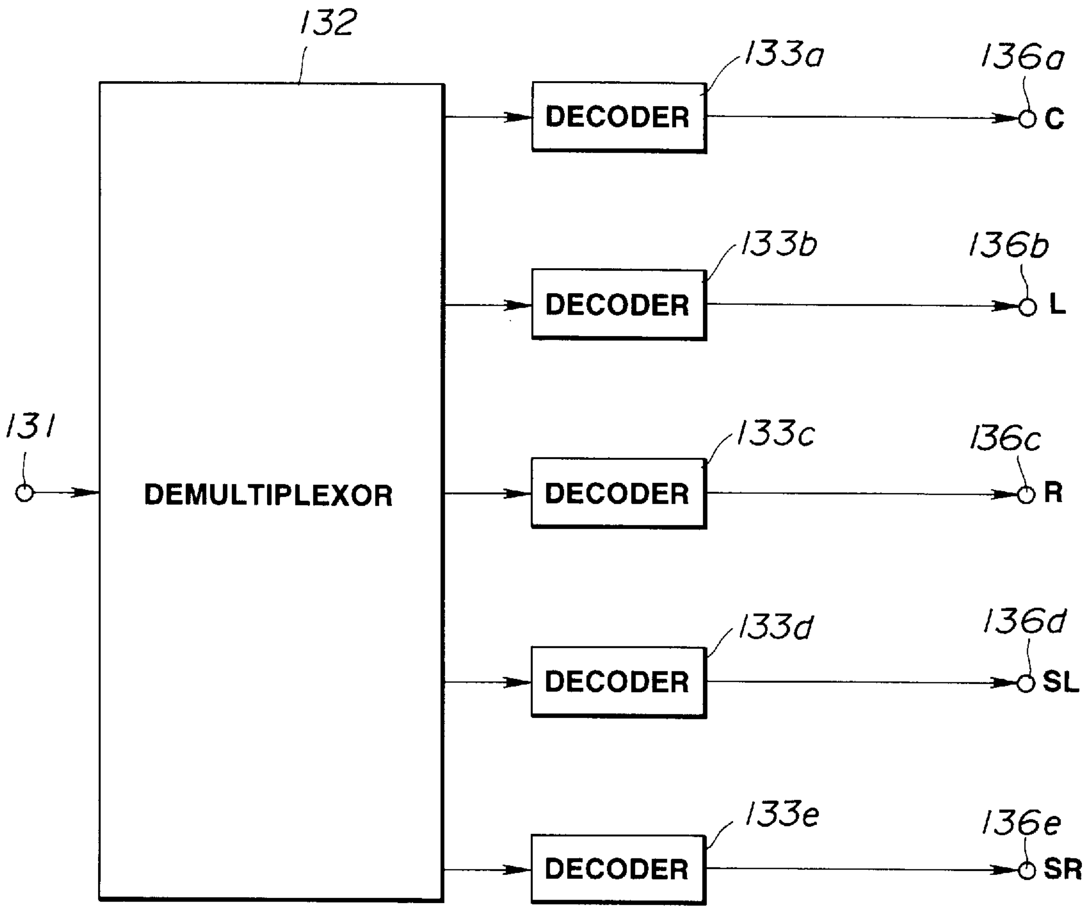
FIG. 7 is a block circuit diagram showing a configuration of a multi-channel audio decoding apparatus not employing the present invention.

FIG. 7 shows, for comparison with the decoder of the present embodiment, a configuration of a multi-channel decoder which effects channel-based decoding, that is, a multi-channel decoder not employing the present invention. The portions corresponding to those of FIGS. 6 and 7 are denoted by the same reference numerals and the description therefor is omitted for ease of understanding.

Referring to FIG. 7, before explanation of FIG. 6, the encoded bitstream, entered at an input terminal 131, are demultiplexed by a demultiplexor 132 into encoded data of respective channels, which are routed, to decoding units 133*a* to 133*e*. The data is decoded by decoding units 133*a* to 133*e* (as hereinafter explained) to decoded audio data which is outputted at output terminals 136*a* to 136*e*.

A bitstream entering the input terminal 131 of the decoder of the embodiment of FIG. 6 is supplied to the demultiplexor 132. Since the bitstream contains data specifying the channels handled in common (parameter information of handling in common) along with channel-based encoded data and data handled in common, the demultiplexor 132 divides the encoded data and the information on the parameters of handling in common from channel to channel and transmits resulting data to the decoding units 133*a* to 133*g*.

The decoding units 133*f* and 133*g*, associated with the channels of the data handled in common, output decoded data handled in common and decoded parameter information for common handling to the distributor for data handled in common 134. The distributor for data handled in common 134 formulate data for respective channels from one or more common-handled data, with the aid of the information on the parameters for handling in common, and distributes the data to respective channels.

The common data synthesizers 135*a* to 135*e* synthesize outputs of the channel-based decoding units 133*a* to 133*e* and an output of the common data distributor 134 and output the resulting data at output terminals 136*a* to 136*e* as decoded data of respective channels.

Thus the decoder of the illustrated embodiment formulates data of respective channels from one or plural data handled in common, based upon the information of the common-handling parameters, using the common data distributor 134, and synthesizes the data with data of respective channels not handled in common, using the synthesizers of common-handled data 135*a* to 135*e* for decoding digital signals of plural channels. Decoding may be achieved by the sole distributor of common-handled data 134 taking charge of distribution even if there exist plural types of channels made up of common-handled data or plural methods of handling in common, or even if data of a specific channel is divided into plural types of common data, which are then encoded in plural channels handled in common.

Figure 8:
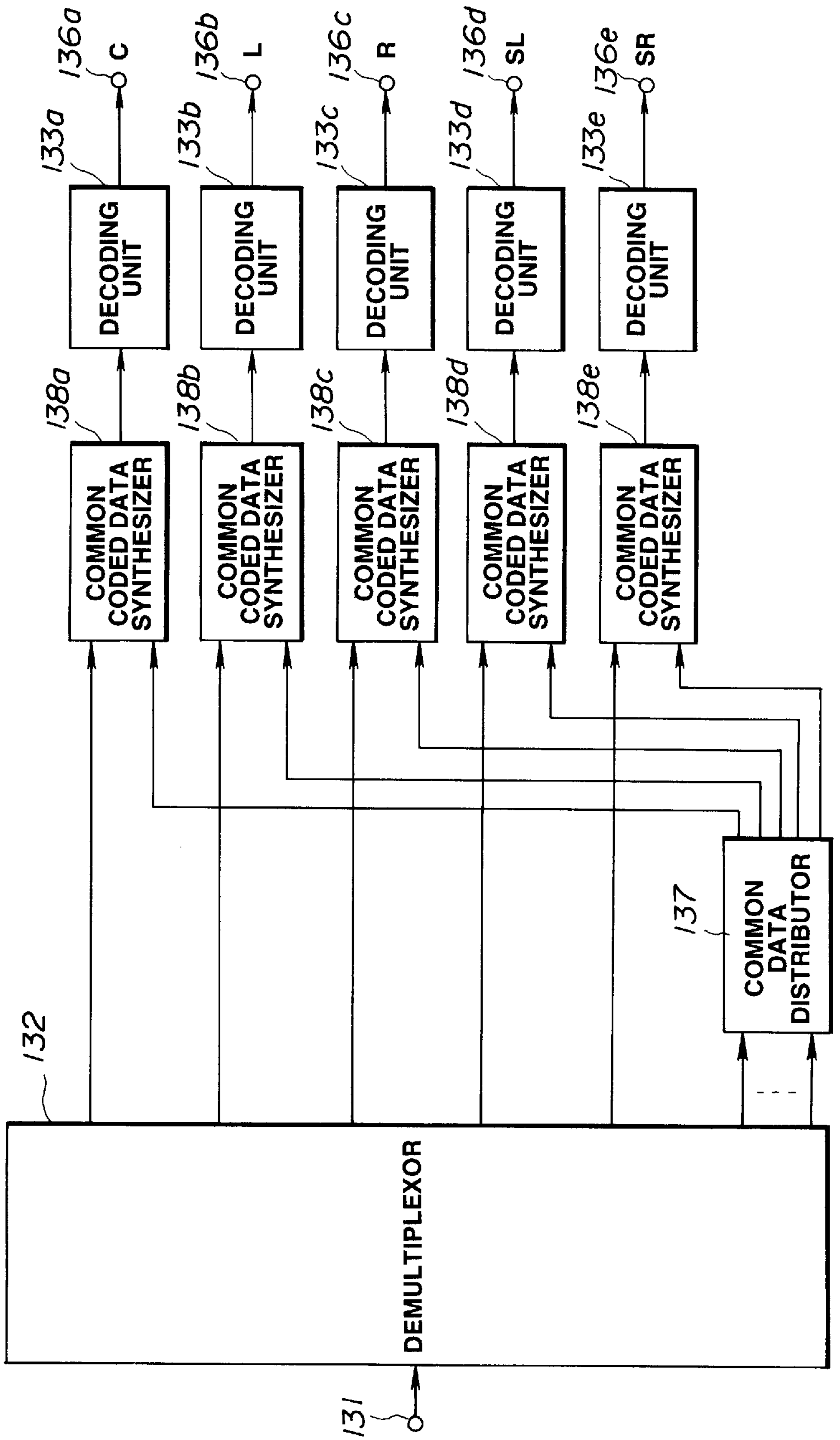
FIG. 8 is a block circuit diagram showing a modification of a multi-channel audio data decoding apparatus of the present invention.

FIG. 8 shows a configuration of a decoder in which common handling of multi-channel data does not depart from the single-channel encoding system employed in the embodiment illustrated and data which are not handled in common in the encoded state may be synthesized with data handled in common.

Referring to FIG. 8, the demultiplexor 132 divides the bitstream entering the input terminal 131 into channel-based data not handled in common on the one hand and data handled in common and the information on the parameters for common handling, on the other hand, and transmits the channel-based data not handled in common to common-coded data synthesizing units 138*a* to 138*e*, while transmitting data handled in common and the information on the parameters for common handling to a common data distributor 137.

The common data distributor 137 formulates channel-based data from one or plural data handled in common, using the information on the parameters for common handling, and distributes the channel-based data to the respective channels.

The common handled data, outputted by the common data distributor 137 and distributed to the respective channels, and the channel-based data not handled in common, outputted by the demultiplexor 132, are routed to associated common-encoded data synthesizers 138*a* to 138*e*. The common coded data synthesizers 138*a* to 138*e* synthesize the data supplied thereto and output them as encoded data.

The decoding units 133*a* to 133*e* of the next stage decode outputs of associated common-coded data synthesizers 138*a* to 138*e*. The outputs of associated common-coded data synthesizers 138*a* to 138*e* are issued as channel-based data at associated output terminals 136*a* to 136*e*.

Since the common data distributor 134 and the common data synthesizers 135*a* to 135*e* are provided upstream of the decoding units 133*a* to 133*e* in the decoder of the embodiment illustrated, the decoder may be reduced in size.

In addition, in the encoding method and apparatus of the present invention, the following technique taking advantage of the channel reproducing environment, may be utilized as a technique enabling reproduction which produces less of an alienated feeling with regard to the hearing sense.

First, the technique of altering the method of handling common data responsive to the recommended audio data reproducing environment is explained.

That is, if the five channels shown in FIG. 4A are to be handled in common, the signals of the center (C) channel, left (L) channel, right (R) channel, left surround (SL) channel and the right surround (SR) channel are level-converted at a ratio of C:L:R:SL:SR= 1.0000:0.7071:0.7071:0.5000:0.5000 and subsequently synthesized. For reproduction, the data is reproduced from a sole channel or distributed at the same ratio to all channels for achieving effective common handling.

If the center (C) channel, left (L) channel and the left surround (SL) channel on one hand and the center (C) channel, right (R) channel and the right surround (SR) channel on the other hand, as shown in FIG. 4B, are to be handled in common, the ratios of C:L:SL 0.7071:1.0000:0.7071 and C:R:SR 0.7071:1.0000:0.7071 may be employed for effective common handling.

If the left (L) channel and the left surround (SL) channel on one hand and right (R) channel and the right surround (SR) channel, on the other hand, as shown in FIG. 4C are to be handled in common, the ratios of L:SL=1.0000:0.7071 and R:SR 1.0000:0.7071 may be employed for effective common handling.

If the left (L) channel, center channel (C) and the right surround (R) channel on one hand and the left surround (SL) channel and the right surround (SR) channel, on the other hand, as shown in FIG. 41), are to be handled in common, the ratios of C:L:R=1.0000:0.7071:0.7071 and SL:SR= 0.7071:0.7071 may be employed for effective common handling.

If the left (L) channel and the center (C) channel on one hand and right (R) channel and the center (C) channel on the other hand as shown in FIG. 4E are to be handled in common, the ratios of C:L=0.7071:1.0000 and C:R= 0.7071:1.0000 may be employed for effective common handling.

The above ratios are optimum values as found by experiments conducted by the present inventors and may assume different values in future experiments.

The above-described encoding method and apparatus may also be modified so that data for restoration of data previous to common handling will be contained in the code, in addition to the common handling information in order to enable reproduction which does not produce an alienated feeling to the hearing sense.

Figure 9:
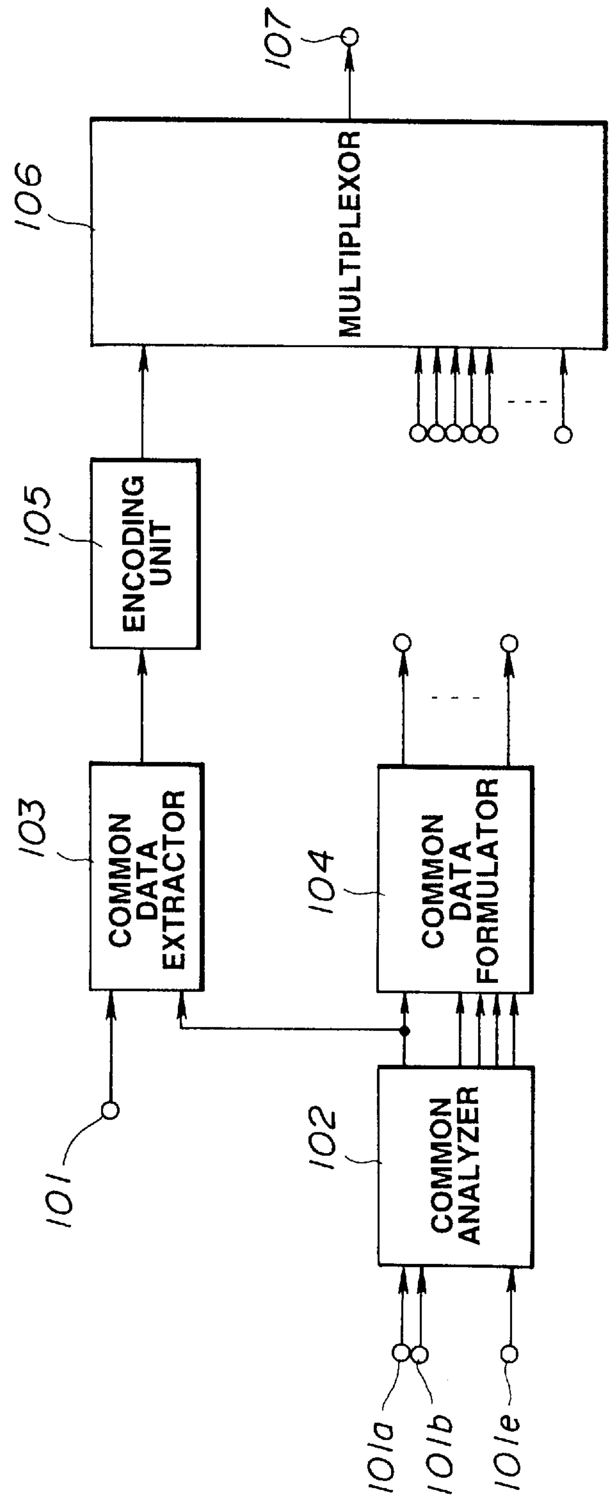
FIG. 9 is a block circuit diagram showing an illustrative configuration for implementing an encoding method of parameters for common handling embodying the present invention.
Figure 10:
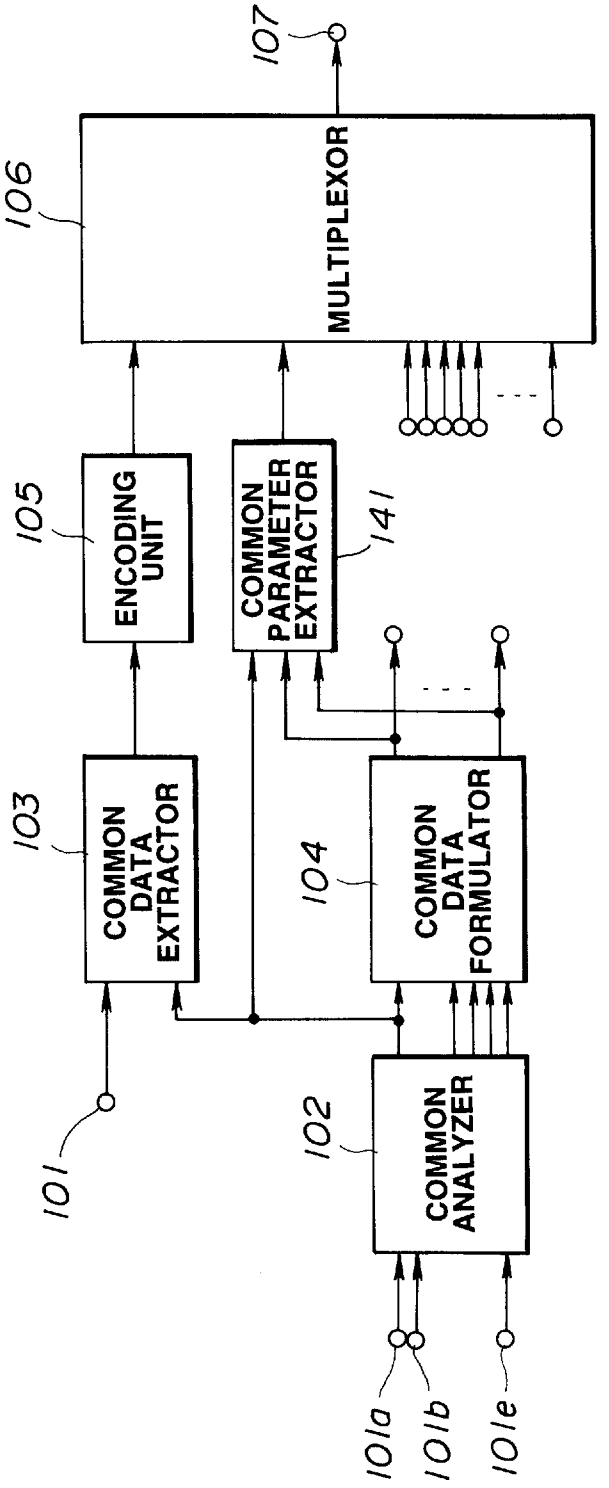
FIG. 10 is a block circuit diagram showing another illustrative configuration for implementing an encoding method of parameters for common handling embodying the present invention.

FIGS. 9 and 10 show the configurations for implementing the method of extracting parameters for reproducing data used for common handling of respective channels from data handled in common. FIG. 9 shows a configuration corresponding to the portions responsible for common handling processing in FIG. 1, while FIG. 10 shows a configuration in which common handling parameter extractor 141 is added to the configuration of FIG. 9.

Figure 11:
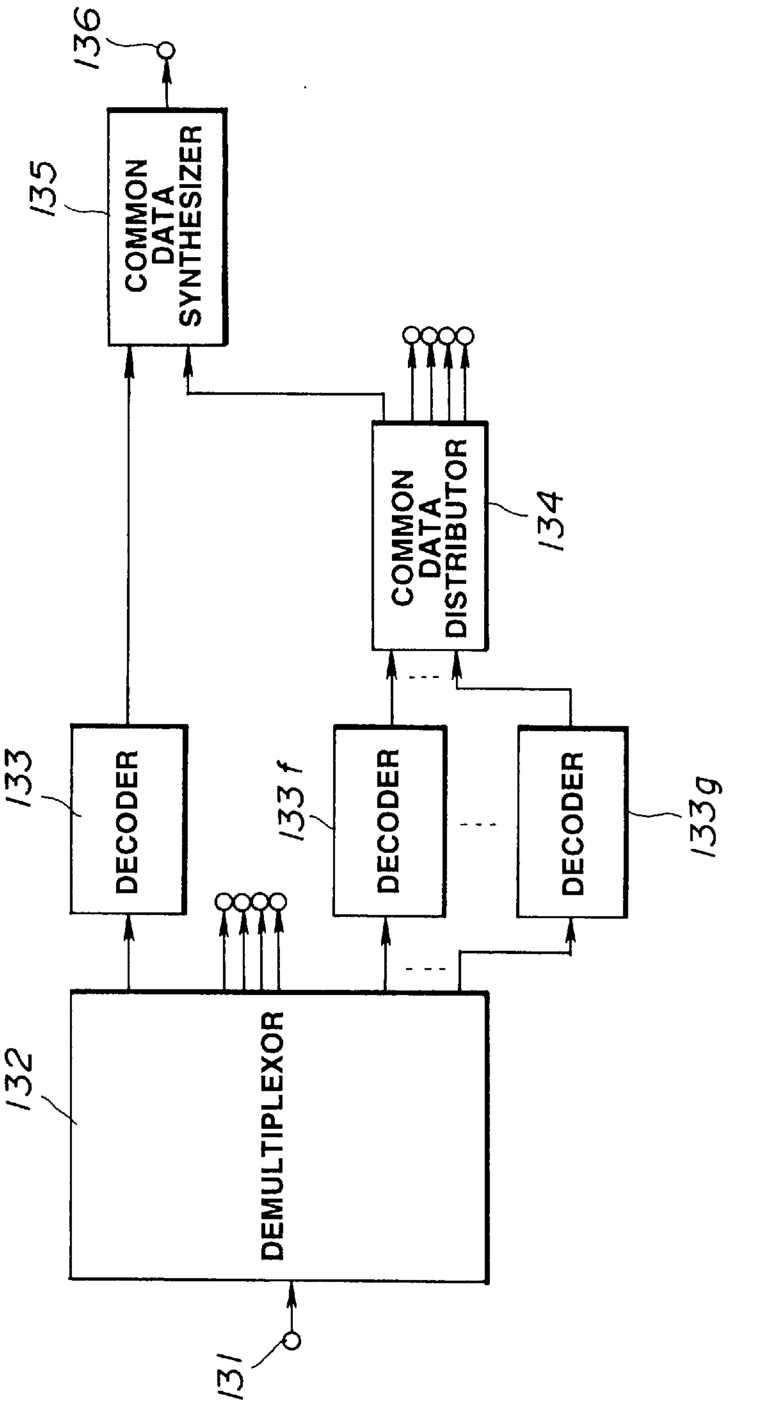
FIG. 11 is a block circuit diagram showing an illustrative configuration for implementing a decoding method of parameters for common handling embodying the present invention.
Figure 12:
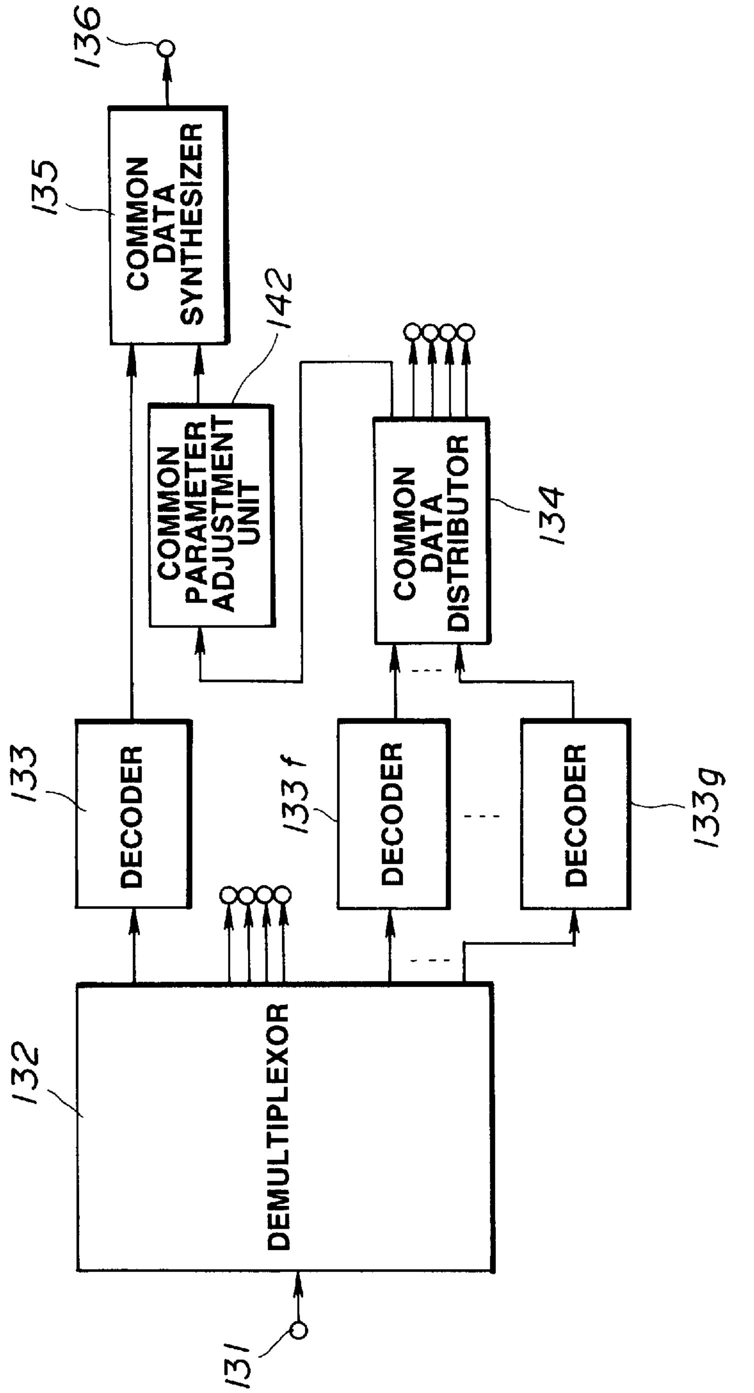
FIG. 12 is a block circuit diagram showing another illustrative configuration for implementing a decoding method of parameters for common handling embodying the present invention.

FIGS. 11 and 12 show the configuration of implementing the method of adjusting the data handled in common using the parameter contained in the code. FIG. 11 shows a configuration corresponding to the portion of FIG. 6 distributing the common handled data to the respective channels and FIG. 12 shows a configuration in which a common handling parameter adjustment unit 142 is added to FIG. 11.

In FIGS. 9 to 12, the constituent elements corresponding to those shown in FIGS. 1 and 6 are denoted by the same reference numerals and the detailed description is omitted for simplicity.

Referring first to FIG. 9, data of respective channels are supplied to input terminals 101 and 101*a* to 101*e*. The data outputted by the common analyzer 102 and entering a common data extractor 103 and the common data formulator 104 is the data used for common handling with the number of such data being equal to the number of channels of sound source data. If the data of a given channel is not used for common handling, the information specifying that such data is not employed is transmitted. On the other hand, data outputted by the common handling data formulator 104 and sent to the multiplexor 106 is the data handled in common, with the number of the data being equal to the number of channels handled in common. The number of the channels handled in common is varied in dependence upon the method of common handling.

On the other hand, data distributed by the common data distributor 134 to respective channels is sent to the common data synthesizer 135*a* to 135*e* and synthesized with the data encoded from channel to channel so as to be outputted as channel-based decoded data.

In the configuration of FIG. 9, the common handling parameter extractor 141 may be provided for each channel, as shown in FIG. 10. Input to the common handling parameter extractor 141 are data and information used for channel-based common handling and all data and information handled in common. The common parameter extractor 141 analyzes the dependency of the channel with respect to the data of the channels handled in common and the technique of resetting the common handling in order to find the scale parameters of the channel under consideration for each frequency band or a set of frequency bands used for encoding as a unit and a scale parameter ratio between respective frequency bands in the channel under consideration. These values are sent to the multiplexor 106 so as to be contained as the codes.

In the decoder of FIG. 11, the common parameter adjustment unit 142 may be provided to respective channels, as shown for the decoder of FIG. 12. To the common parameter adjustment unit 142 are input common handling data for a channel under consideration, outputted from the common handling data distributor 134, and the common handling parameter information for a channel under consideration outputted by the demultiplexor 132. By employing these data, the common parameter adjustment unit 142 modifies the common handling data by exploiting the technique for canceling the common handling or dependency of the data of the channel under consideration among the channels handled in common. By this, the sound field closer to the original signal data of the channel under consideration than is achievable with the decoder of FIG. 1 may be reproduced.

Although this system may be employed as an independent system irrelevant to the channel reproducing environment, it is possible to formulate more effective common handling parameters by analyzing the common handling parameters by taking advantage of data and the reproducing environment since a degree of data dependency can be predicted if the playback environment is specified.

For enabling reproduction by the encoding method and apparatus of the embodiment illustrated which does not evoke an alienated feeling to the hearing sense, there is an encoding method which exploits the time change information between sound frames in the selection of channels to be handled in common or the method for common handling processing.

The term "sound frame" means an audio data processing unit for encoding and decoding which consists of 512 samples having a sampling frequency of 44.1 kHz for the ATRAC system employed in the present embodiment.

Meanwhile, it is possible with the encoding method and apparatus of the present embodiment to alter the selection of channels to be handled in common or the method for common handling processing from one sound frame to another. If the selection of optimum channel or processing method is done within each sound frame, it may occur that channel or processing method selection is varied from one sound frame to another to produce an alien hearing feeling due to such variation.

Thus, in the channel selection, such alien hearing feeling may be prohibited from occurring by monitoring the transition of selection from one sound frame to another to avoid continuation of common handling and non-common handling throughout the channels or to limit variation in the selection under the stationary state in which there is little change in input data.

In the selection of the method for common handling processing, frequent switching on the sound frame basis is not advisable since the difference in sound quality due to difference in the processing method is large as compared to the case of channel selection and also since the encoder and the decoder then need to be modified in dependence upon the processing method. Thus it is advisable to effect switching in terms of several sound frames at the minimum.

A modification of the present invention is hereinafter explained.

In the previous embodiment, channel selection is made from among five channels, namely the center (C), left (L), right (R), left surround (SL) and right surround (SR) channels. FIGS. 13A to 13F show selection from among seven channels, namely the above five channels plus left center (CL) and right center (CR) channels.

Figure 13A:
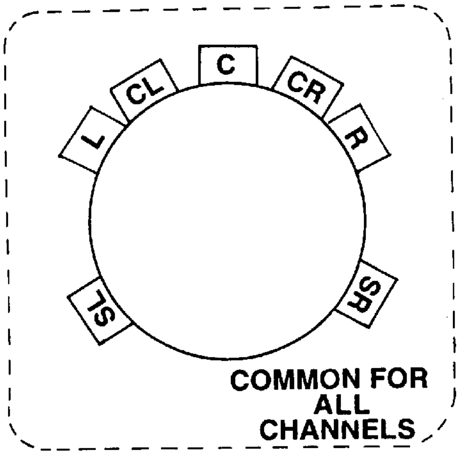
FIGS. 13A–13F illustrate different sorts of selection of channels for common handling for seven channels embodying the present invention.

FIG. 13A shows common handling of the totality of channels.

Figure 13B:
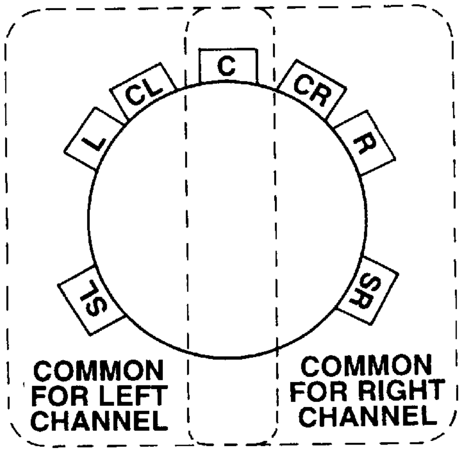

FIG. 13B shows common handling of four channels, namely center (C), left center (CL), left (L) and left surround (SL) channels, as left route channels, and common handling of four channels, namely center (C), left center (CR), right (R) and right surround (SR) channels, as right route channels.

Figure 13C:
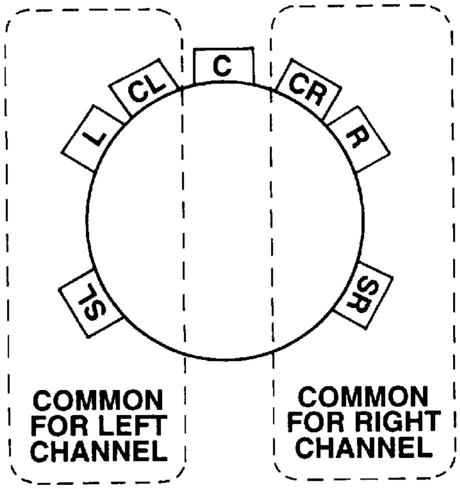

FIG. 13C shows common handling of three channels, namely left center (CL), left (L) and left surround (SL) channels, as left route channels, and common handling of three channels, namely right center (CR), right (R) and right surround (SR) channels, as right route channels.

Figure 13D:
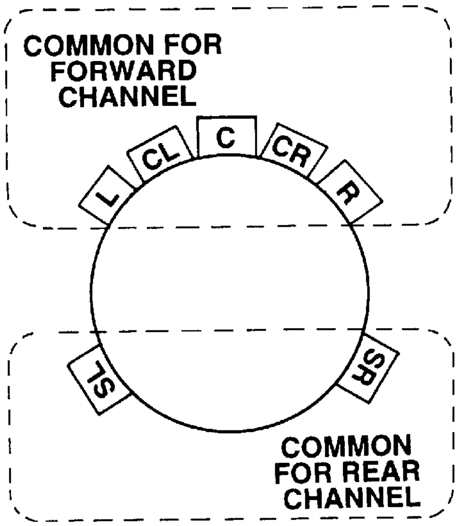

FIG. 13D shows common handling of five channels, namely center (C), left center (CL), left (L), right center (CR) and right (R) channels, as forward route channels, and common handling of two channels, namely left center (CL) and right center (SR), as backward route channels.

Figure 13E:
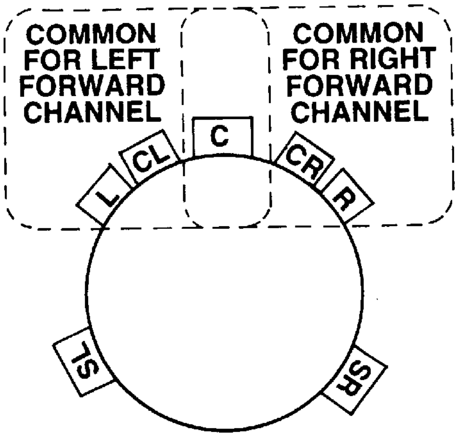

FIG. 13E shows common handling of three channels, namely center (C), left center (CL) and left (L), as left forward route channels, and common handling of three channels, namely center (C), right center (SR) and right (R), as right forward route channels.

Figure 13F:
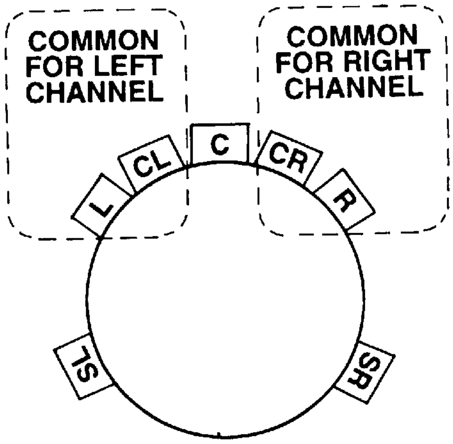

FIG. 13F shows common handling of two channels, namely left center (CL) and left (L), as left forward route channels, and common handling of two channels, namely right center (CR) and right (R), as right forward route channels.

In the present embodiment, suitable selection of channels for common handling may be achieved by preferential processing in which the highest priority is put on the technique of FIG. 13A capable of common handling of the largest number of channels and the lowest priority is put on the technique of FIG. 13F.

By exploiting the combinations of common handling of channels as described above, it becomes possible to reduce the alienated feeling invoked due to common handling in the case of seven channels.

In FIG. 13, a sub-woofer (SW) channels may further be annexed to provide an eight-channel system. However, the sub-woofer (SW) channel is targeted for low frequency reproduction and hence is not suited for common handling. Thus the channel many be annexed to the system without taking part in the common channel handling.

Figure 14:
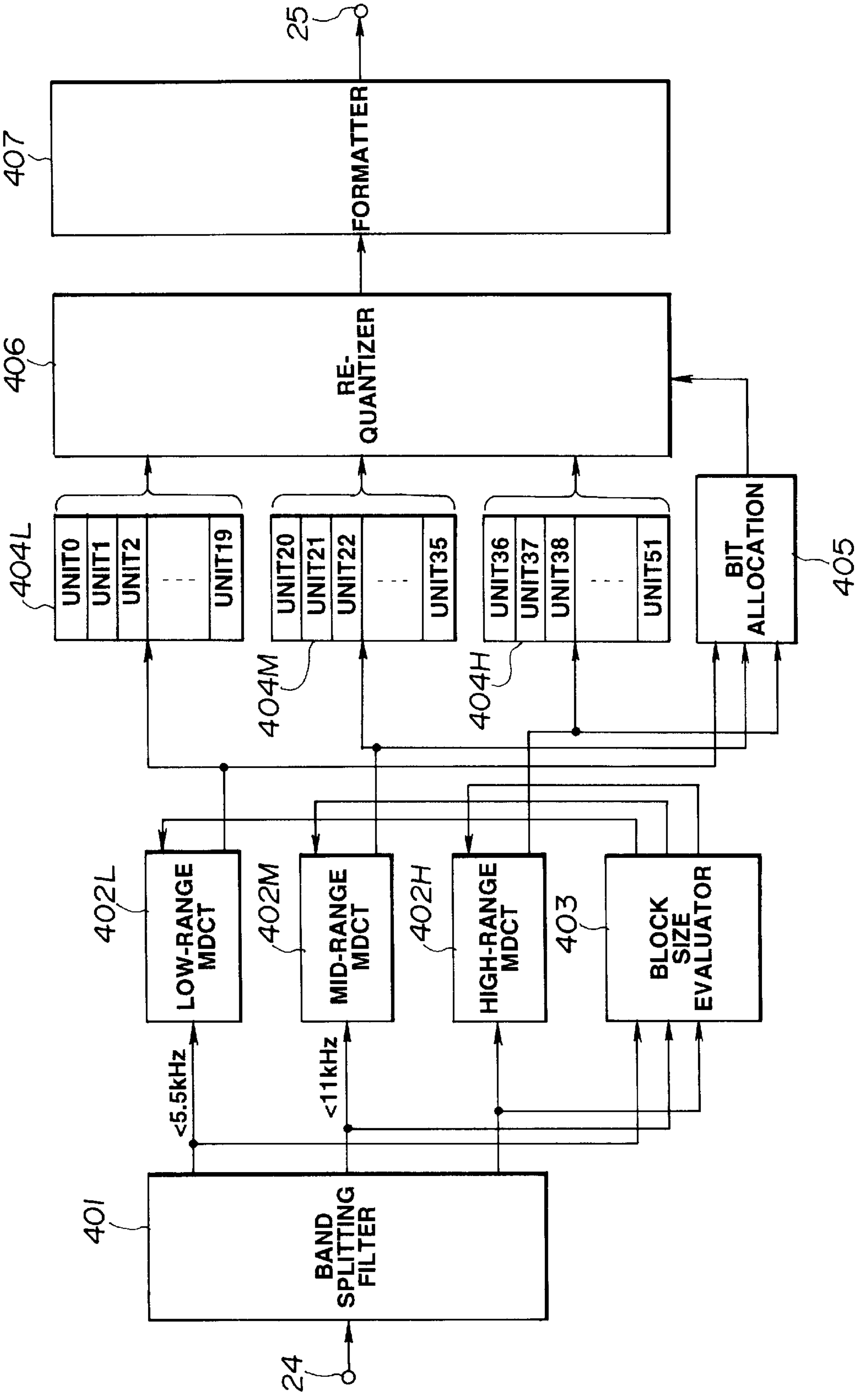
FIG. 14 is a block circuit diagram showing an illustrative configuration of an encoding unit of the encoding apparatus embodying the present invention.

The illustrative construction and operation of the encoding unit 105 will be explained by referring to FIGS. 14 to 17. FIG. 14 shows a construction of an encoding unit 105 for one channel.

In FIG. 14, audio data corresponding to the original data from which common-handled portions have been extracted by the common data extractor 103, that is sampled and quantized audio data, are supplied to an input terminal 24. The signals fed to the input terminal 24 are split by a band splitting filter 401 into time-domain signal components in three frequency bands, namely a low frequency band of 0 to 5.5 kHz, a mid frequency band of 5.5 kHz to 11 kHz, and a high frequency band of not lower than 11 kHz, that is 11 kHz to 22 kHz.

Of the signal components of these three frequency bands from the band splitting filter 401, those of the low frequency band, mid-frequency band and the high-frequency band are sent to MDCT circuits 402L, 402M and 402H, respectively, so as to be resolved into frequency-domain signal components. The time block length for MDCT may be varied from one frequency band to another, such that, in the signal portion where signal components are changed steeply, the time block length is reduced to raise time resolution, whereas, in the stationary signal portion, the time block length is increased for effective transmission of signal components and for controlling the quantization noise.

The time block length is determined by a block size evaluator 403. That is, the signal components of the three frequency bands from the band splitting filter 401 are also sent to the block size evaluator 403 which then determines the time block length for MDCT and transmits the information specifying the thus set time block length to the MDCT circuits 402L, 404M and 402H.

Of two time block lengths for varying the time block lengths for MDCT, the longer time block length is termed a long mode and corresponds to the time duration of 11.6 msec. The short block length is termed a short mode and raises the time resolution up to 1.45 ms and to 2.9 ms for the low range of up to 5.5 kHz and for the mid range of from 5.5 to 11 kHz, respectively.

The audio signals thus resolved into signal components on two-dimensional time-frequency areas, termed block floating units, are divided by normalization circuits 404L, 404M and 404H into a sum total of 52 block floating units in the low range, mid range and in the high range, while being normalized from one block floating unit to another by way of setting scale factors.

The bit allocator 405 analyzes, by exploiting the psychoacoustic characteristics of the human auditory system, of which components the audio signals are constituted. The results of analyses are sent to a re-quantizer 406 also fed with unit-based signals from the normalization circuits 404L to 404H.

The re-quantizer 406 determines, based upon the results of analyses, the quantization steps for re-quantization of the respective units, and formulates corresponding parameters, that is, decides the word lengths, while carrying out the requantization.

Finally, a formatter 407 assembles unit-based parameter information data and re-quantized frequency-domain signal components into a bitstream for one channel sent to the multiplexor 106 of FIG. 1 in accordance with a pre-set format. An output of the formatter 407 is provided as the bitstream at an output terminal 26.

The bitstream is recorded on a recording medium, such as an optical disc or a motion picture film, by a recorder configured for effecting error correction or modulation.

The above-described encoding operation is carried out in terms of a sound frame as a unit.

Figure 15:
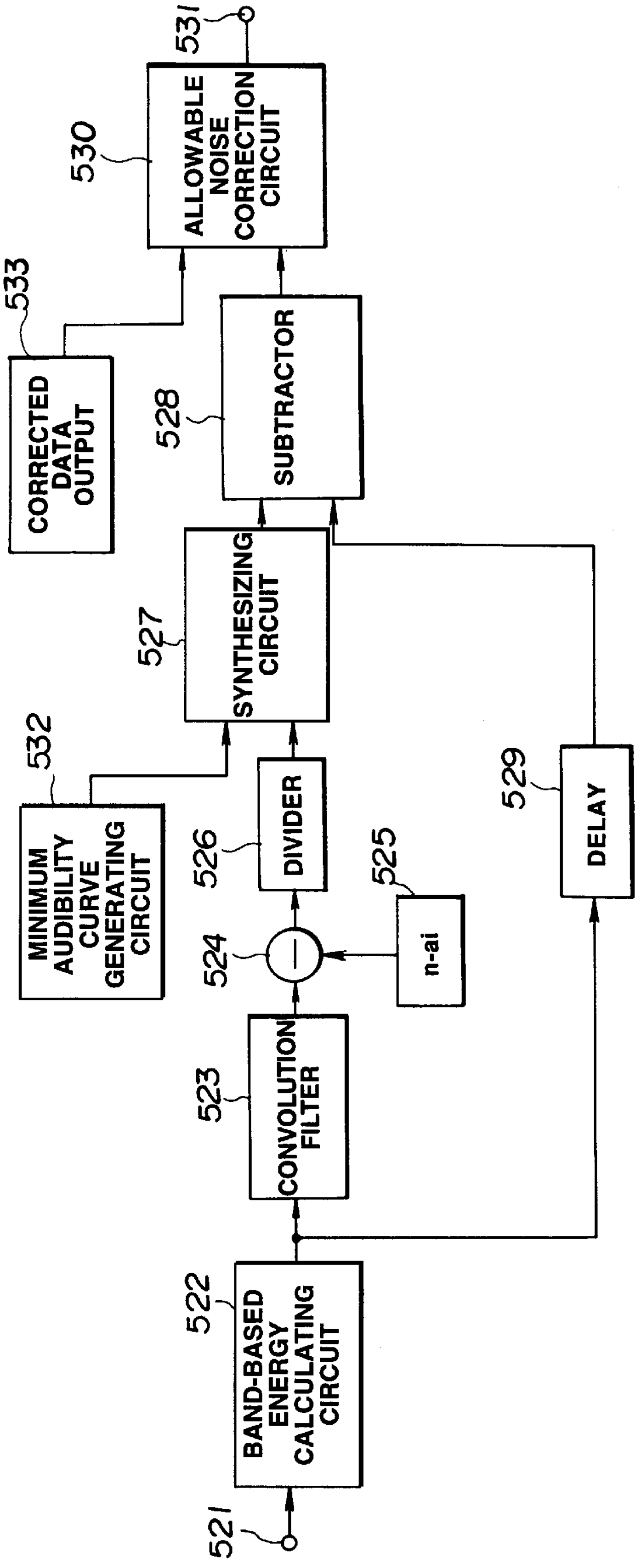
FIG. 15 is a block circuit diagram showing an illustrative configuration of a bit allocator of the encoding unit.

The bit allocator 405 is configured as shown specifically in FIG. 15.

Ref erring to FIG. 15, the frequency-domain signal components, called hereinafter as data, are sent to an input terminal 521 from the MDCT circuits 402L, 402M and 402H.

Figure 16:
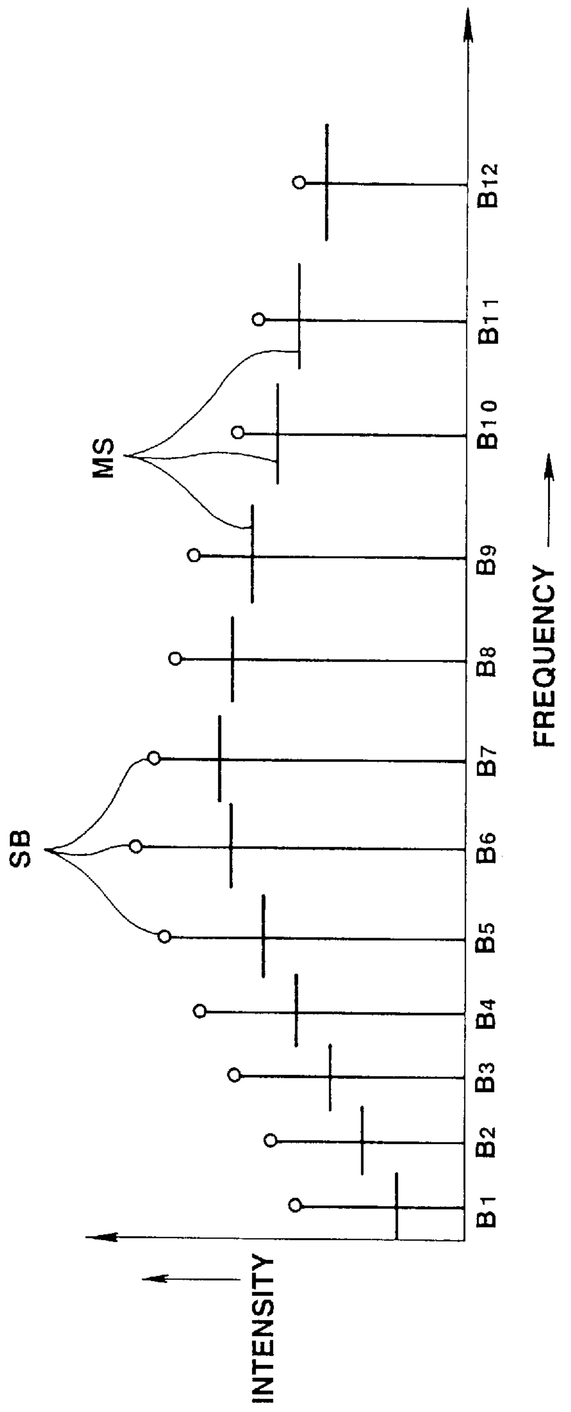
FIG. 16 is a graph for illustrates a Bark spectrum and the masking threshold level.

The frequency-domain spectral data is transmitted to a band-based energy calculating circuit 522 in which the energies of the critical bands are found by calculating the sum total of the squared amplitudes of the spectral components in the respective bands. The amplitude peak values or mean values may also be employed in place of signal energy in the respective bands. Each spectral component indicating the sum value for each of the respective bands is indicated as Bark spectrum SB in FIG. 16 as an output of the band-based energy calculating circuit 522. In FIG. 16, 12 bands B1 to B12 are shown as indicating the critical bands for simplifying the drawing.

It is noted that an operation of multiplying each spectral component SB by a pre-set weighting function for taking into account the effects of masking is performed by way of convolution. To this end, an output of the band-based energy calculating circuit 522, that is each value of the Bark spectral component SB, is transmitted to a convolution filter circuit 523. The convolution filter circuit 523 is made up of a plurality of delay elements for sequentially delaying input data, a plurality of multipliers, such as 25 multipliers associated with the respective bands, for multiplying outputs of the delay elements with filter coefficients or weighting functions, and an adder for finding the sum of the outputs of the respective multipliers.

"Masking" means the phenomenon in which certain signals are masked by other signals and become inaudible due to psychoacoustic characteristics of the human hearing sense. The masking effect may be classified into the time-domain masking effect produced by the time-domain audio signals and concurrent masking effect produced by the frequency-domain signals. By this masking, any noise present in a masked portion becomes inaudible. In actual audio signals, the noise within the masked range is an allowable noise.

By way of a concrete example of multiplication coefficients or filter coefficients of the respective filters of the convolution filter circuit 523, if the coefficient of a multiplier M for an arbitrary band is 1, outputs of the delay elements are multiplied by coefficients 0.15, 0.0019, 0.0000086, 0.4, 0.06 and 0.007 at the multipliers M−1, M−2, M−3, M+1, M+2 and M+3, M being an arbitrary integer of from 1 to 25, by way of performing convolution of the Bark spectral components SB.

An output of the convolution filter circuit 523 is transmitted to a subtractor 524 which is employed for finding a level $\alpha$ corresponding to the allowable noise level in the convolved region. Meanwhile, the allowable noise level $\alpha$ is such a level which will give an allowable noise level for each of the critical bands by deconvolution as will be described subsequently. The subtractor 524 is supplied with an allowance function (a function representative of the masking level) for finding the level $\alpha$. The level $\alpha$ is controlled by increasing or decreasing the allowance function. The allowance function is supplied from a (N−ai) function generator 525 as will be explained subsequently.

That is, the level $\alpha$ corresponding to the allowable noise level is found from the equation:

$$\alpha=S-(n-ai) \tag{1}$$

where i is the number accorded sequentially to the critical bands beginning from the lower side, n and a are constants where a >0 and S the intensity of the convolved Bark spectrum. In equation (1), (n−ai) represents the allowance function. The values n and a may be set so that n=38 and a=0.5.

The level $\alpha$ is found in this manner and transmitted to a divider 526 for deconvolving the level $\alpha$ in the convolved region. By this deconvolution, the masking threshold is found from the level $\alpha$. This masking threshold becomes the allowable noise level. Although the deconvolution necessitates complex arithmetic-logical steps, it is performed in the present embodiment in a simplified manner by using the divider 526.

The masking threshold signal is transmitted via a synthesizing circuit 527 to a subtractor 528 which is supplied via a delay circuit 529 with an output of the band-based energy detection circuit 522, that is the above-mentioned Bark spectral components SB. The subtractor 528 subtracts the masking threshold signal from the Bark spectral components SB so that the portions of the spectral components SB lower than the level of the masking threshold MS are masked. The delay circuit 529 is provided for delaying the signals of the Bark spectral components SB from the energy detection circuit 522 in consideration of delay produced in circuitry upstream of the synthesis circuit 527.

An output of the subtractor 528 is outputted via an allowable noise correction circuit 530 at an output terminal 531 so as to be transmitted to a ROM, not shown, in which the information concerning the number of the allocated bits is stored previously. The ROM outputs the information concerning the number of allocated bits for each band, depending on an output of the subtraction circuit 528 supplied via an allowable noise correction circuit 530.

The information concerning the number of the allocated bits thus found is transmitted to a re-quantizer 406 of FIG. 14 to permit the frequency-domain data from the MDCT circuits 494L to 404H to be quantized in the re-quantizer 406 with the numbers of bits allocated to the respective bands.

In sum, the re-quantizer 406 quantizes the bandbased data with the number of bits allocated in dependence upon the difference between the energy or peak values of the critical bands or sub-bands further divided from the critical bands for a higher frequency and an output of the above-mentioned level setting means.

Figure 17:
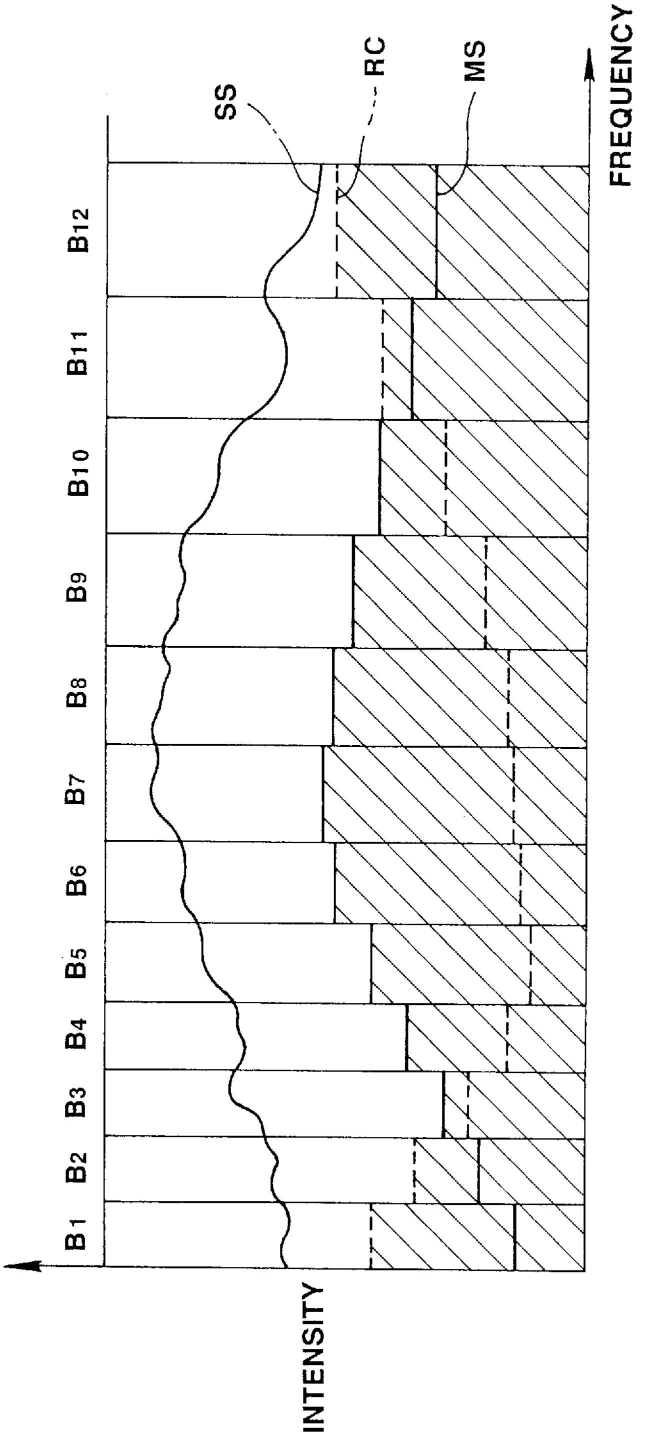
FIG. 17 is a graph showing a signal level, a minimum audibility curve and a masking threshold level synthesized together.

The synthesizing circuit 527 may also be designed to synthesize the masking threshold MS and data from the minimum audibility curve RC from the minimum audibility curve generating circuit 532 representing psychoacoustic characteristics of the human hearing sense as shown in FIG. 17. If the absolute noise level is lower than the minimum audibility curve RC, the noise becomes inaudible.

The minimum audibility curve differs with the difference in the playback sound level even though the encoding is made in the same manner. However, since there is no marked difference in the manner of music entering the 16-bit dynamic range in actual digital systems, it may be presumed that, if the quantization noise of the frequency range in the vicinity of 4 kHz most perceptible to the ear is not heard, the quantization noise lower than the level of the minimum audibility curve is not heard in any other frequency range.

Thus, if the recording/reproducing device is employed so that the noise in the vicinity of 4 kHz is not heard, and the allowable noise level is to be obtained by synthesizing the minimum audibility curve RC and the masking threshold MS, the allowable noise level may be up to the level indicated by hatched lines in FIG. 17. In the present embodiment, the level of 4 kHz of the minimum audibility curve is matched to the minimum level corresponding to e.g., 20 bits. In FIG. 17, the signal spectrum SS is also shown.

Besides, the allowable noise correction circuit 530 corrects the allowable noise level in the output of the subtractor 528 based on the information of the equal-loudness curve transmitted from a correction information outputting circuit 533. The equal-loudness curve is a characteristic curve concerning psychoacoustic characteristics of human hearing sense, and is obtained by finding the sound pressures of the sound at the respective frequencies heard with the same loudness as the pure tone of 1 kHz and by connecting the sound pressures by a curve. It is also known as an equal loudness sensitivity curve. The equal-loudness curve also delineates a curve which is substantially the same as the minimum audibility curve shown in FIG. 17.

With the equal-loudness curve, the sound in the vicinity of 4 kHz is heard with the same loudness as the sound of 1 kHz, even although the sound pressure is decreased by 8 to 10 dB from the sound of 1 kHz. Conversely, the sound in the vicinity of 10 kHz cannot be heard with the same loudness as the sound of 1 kHz unless the sound pressure is higher by about 15 dB than that of the sound of 1 kHz. Thus it may be seen that, in the allowable noise correction circuit 530, the allowable noise level preferably has frequency characteristics represented by a curve conforming to the equal-loudness curve. Thus it may be seen that correction of the allowable noise level in consideration of the equal-loudness curve is in conformity to psychoacoustic characteristics of the human hearing sense.

Figure 18:
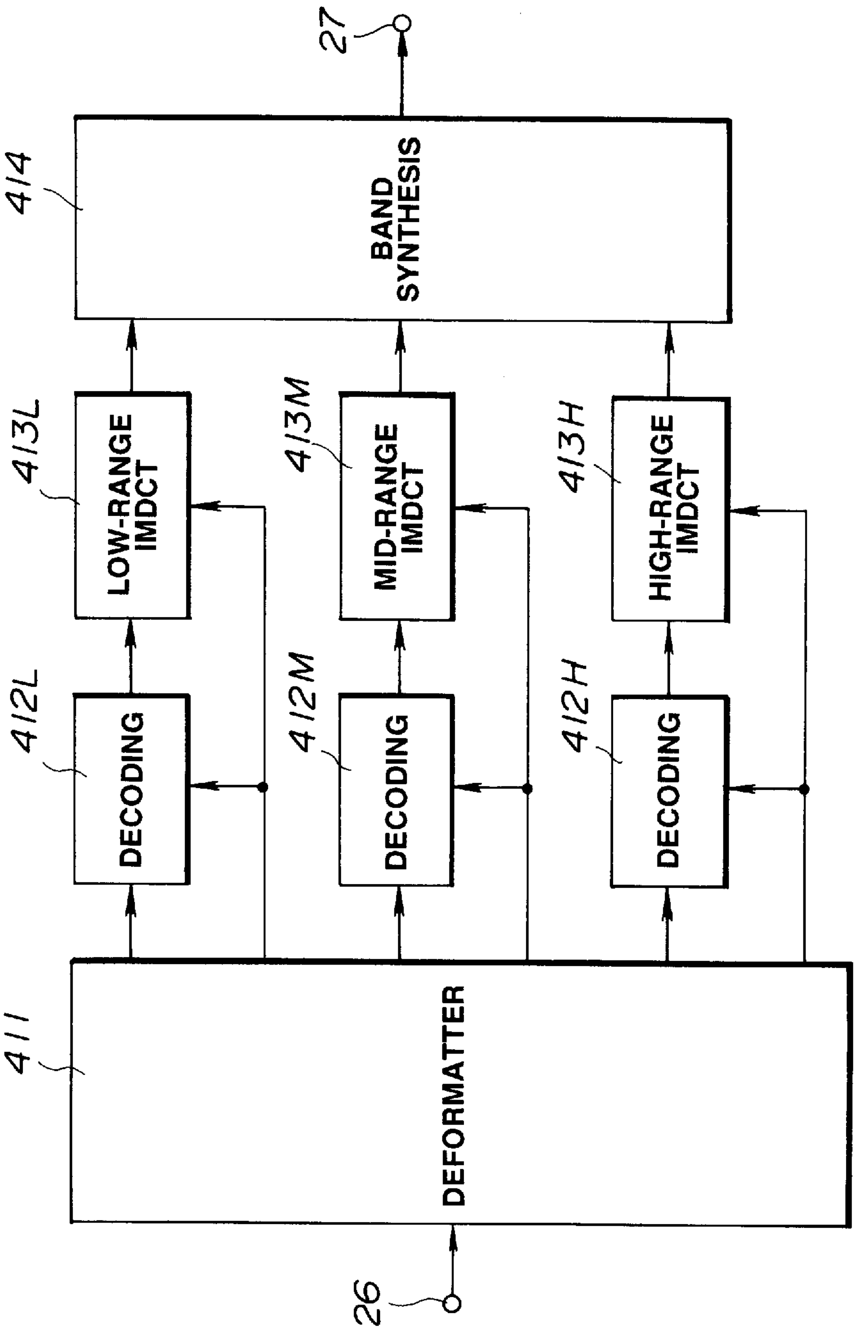
FIG. 18 is a block circuit diagram showing an illustrative configuration of a decoding unit of a decoding apparatus embodying the present invention.

FIG. 18 shows an illustrative configuration of the decoding unit 133 of FIG. 6 corresponding to the encoding unit 105 of FIG. 1.

The decoding unit of FIG. 18 decodes encoded signals for one of plural channels read by reproducing means, such as a magnetic head or an optical head, from a recording medium, such as an optical disc or a motion picture film as later explained.

In FIG. 18, encoded data from the demultiplexor 132 of FIG. 5 is fed to a terminal 26 and thence fed to a deformatter 411. The deformatter performs an operation which is reverse to that performed by the formatter 407, in order to produce the unit-based parameter information and the re-quantized frequency-domain signal components, that is quantized MDCT coefficients.

The unit-based quantized MDCT coefficients from the deformatter 411 are sent to a decoding circuit for the low frequency range 412L, a decoding circuit for the mid frequency range 412M and to a decoding circuit for the high frequency range 412H. These decoding circuits 412L to 412H are also fed with the parameter information from the deformatter 411. Using the parameter information, the decoding circuits 412L to 412H perform decoding and cancellation of bit allocation.

Outputs of these decoding circuits 412L to 412H are sent to associated IMDCT circuits 413L to 413H. The IMDCT circuits 413L to 413H are also fed with the parameter information and transform the frequency-domain signal components into time-domain signal components. These partial-range time-domain signal components are decoded by a band-synthesis circuit 414 to full-range signals.

An instance of recording of data encoded by the encoding method and apparatus of the present embodiment on a motion picture film as an example of the recording medium is explained by referring to FIGS. 19A–19D.

Figure 19A:
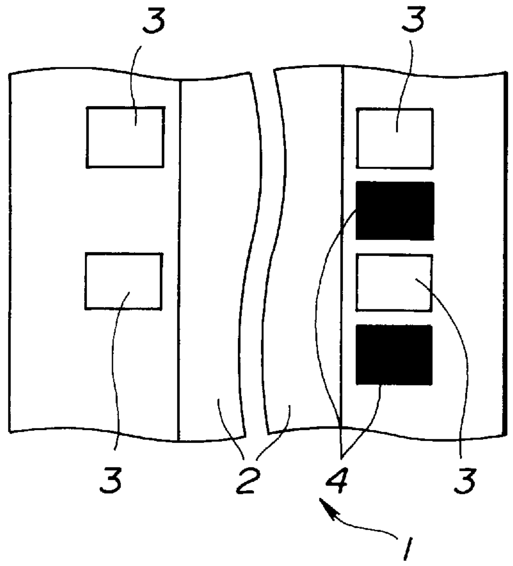
FIGS. 19A–19B illustrate recording positions of encoded signals on a motion picture film.
Figure 19B:
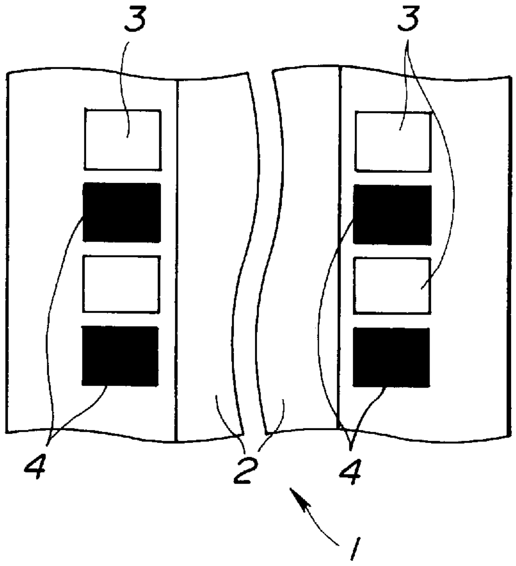
Figure 19C:
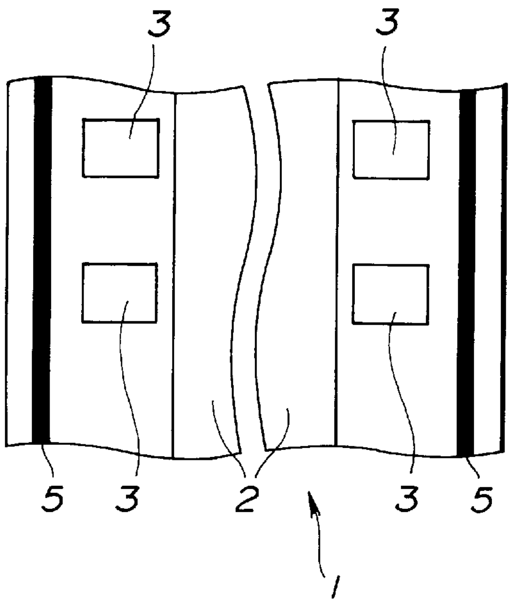
Figure 19D:
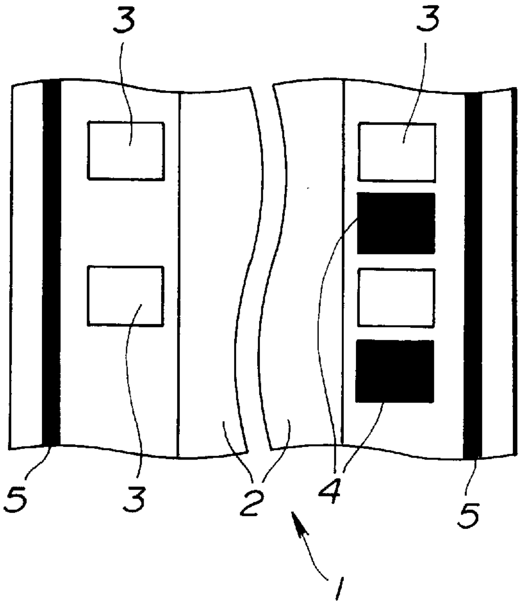

That is, the encoded data is recorded on a motion picture film 1 shown in FIGS. 19A–19D. The recording positions of the encoded data on the motion picture film 1 may be exemplified by recording regions 4 between perforations 3 of the motion picture film 1, as shown in FIG. 19A, recording regions 4 between the perforations 3 on the same side of the film 1 as shown in FIG. 19B, longitudinal recording regions 5 between the perforations 3 and the longitudinal edge of the film 1, as shown in FIG. 19C, and by both the longitudinal recording regions 5 between the perforations 3 and the longitudinal edge of the film 1 and recording regions 4 between perforations 3, as shown in FIG. 19D.

By referring to FIG. 20, an instance of recording of data encoded by the encoding method and apparatus of the present embodiment on an optical film as an example of the recording medium is explained.

FIG. 20 shows an example of header data of each channel, as a part of the encoded bitstream, employed in practicing the present invention.

The header data is made up of several flags, the state of 1/0 of which specifies various conditions concerning the next following bitstream. Only part of the bitstream is disclosed herein and description on the conditions not having direct pertinence to the present invention is omitted.

The common channel handling mode is specified by a flag cplcpf. [su] and [ch] indicate the sound frame number and the channel number, respectively. The flag cplcpf is a 4-bit code and can be defined for up to a maximum of four items. If there is no "i" in any bits, that is if the flag is defined as "0000", it specifies that there is no data handled in common in the bitstream of the channel.

If the mode of handling all channels in common is selected, the flags cplcpf of all channels are set to "1000" and the all channel common handle data is entered in the first acbs (data handled in common).

If the left route channel common handle mode or the right route channel common handle mode is selected, the flag cplcpf of each channel selected for common handling of the left route channels is set to "1000", while the flag cplcpf of each channel selected for common handling of the right route channels is set to "0100". The left route channel common handling data is entered in the first acbs, while the right route channel common handling data is entered in the second acbs.

That is, which acbs is to be used for each channel may be selected by the bits of the flag cplcpf.

Thus the combinations can be varied by using the above-described encoded bitstream and the header data.

Figure 21:
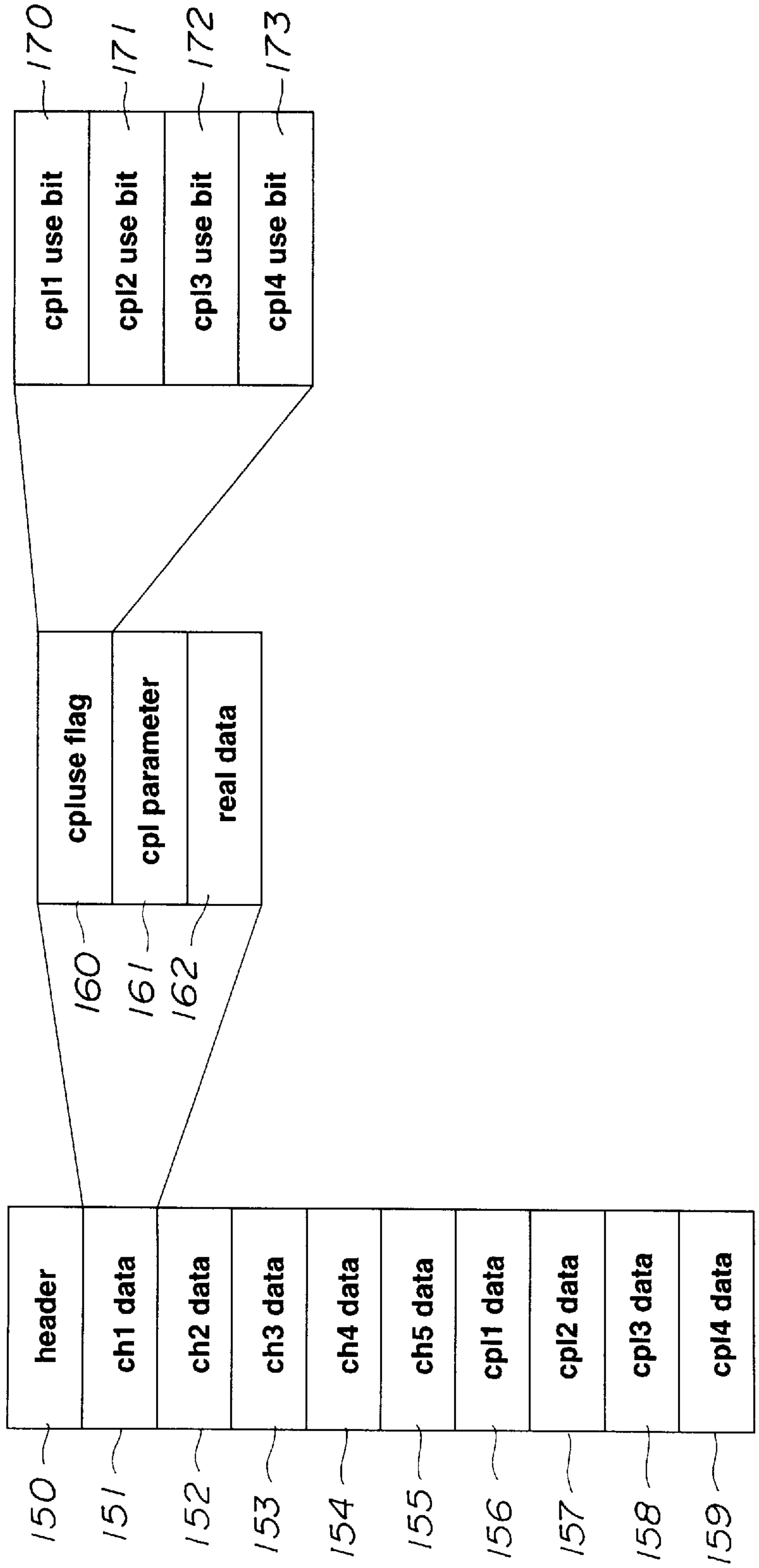
FIG. 21 is a diagrammatic view showing a configuration of an encoded bitstream.

The configuration of the encoded bitstream is shown schematically in FIG. 21 in which reference number 150 denotes the header of the entire bitstream, reference numbers 151 to 155 denote the data regions of each channel and reference numbers 156 to 159 denote the common-handling data regions of four channels.

The data regions 151 to 155 of each channel contains common-handling flag (cpl use flag) 160, common-handling parameters (CPL parameter) 161 and data (real data) 162. The common-handling flag (cpl use flag) 160 is made up of 4 bits (cpll-4 use bit) 170 to 173 as explained as cplchf in FIG. 20.

Figure 22:
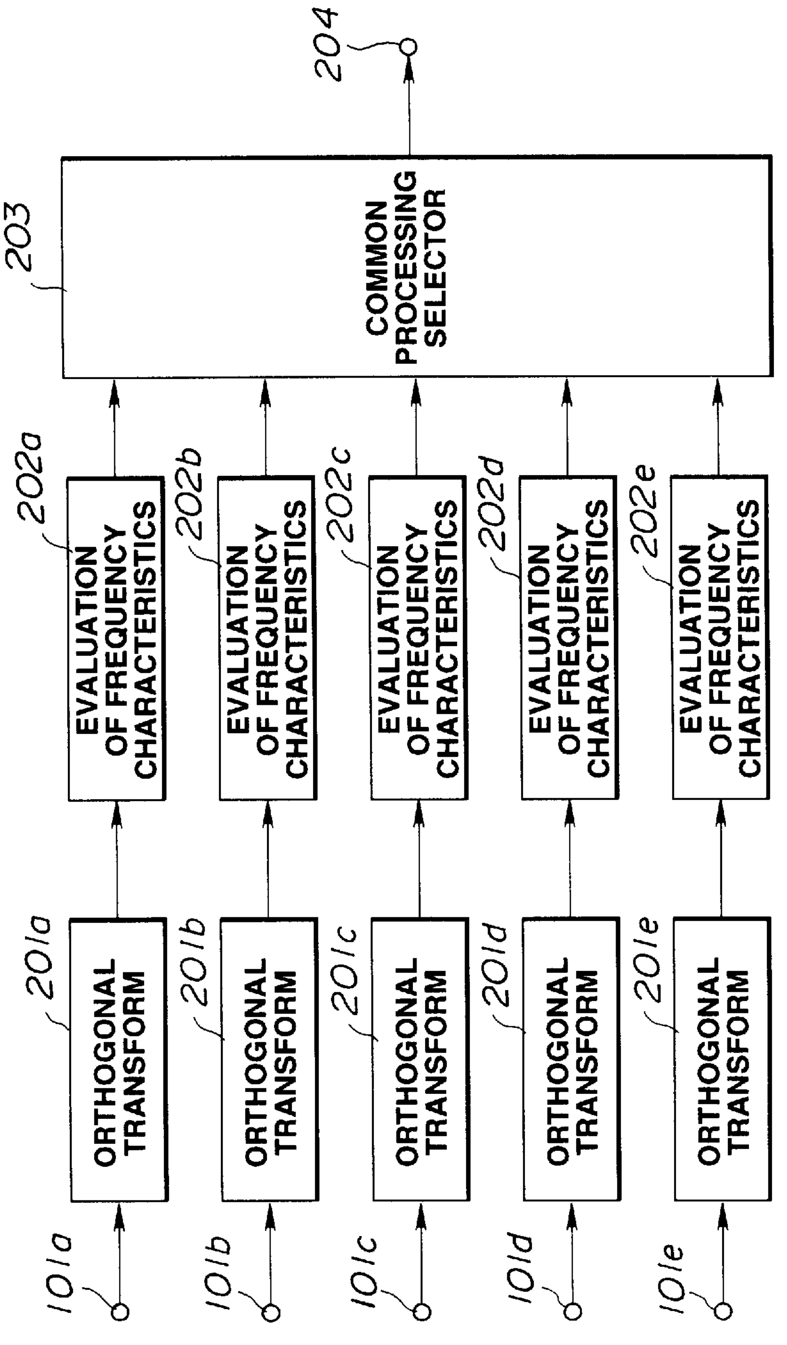
FIG. 22 is a block circuit diagram showing a configuration of an common analyzer of another encoding apparatus of the present invention.

FIG. 22 shows a modification of the common handling analyzer 102.

In this figure, audio data of respective channels, that is the center (C), left (L), right (R), left surround (SL) and right surround (SR) channels, fed via an input terminals 101*a* to 101*e*, are fed to orthogonal transform units 201*a* to 201*e* where they are transformed into frequency-domain signal components which are outputted.

The frequency characteristics evaluators 202*a* to 202*e* find, based upon frequency-domain signal component data for respective channels from the orthogonal transform circuits 201*a* to 201*e*, the parameters of the psychoacoustic characteristics of the human hearing sense, such as minimum audibility curve or masking threshold, and output the results along with frequency-domain signal component data.

A common processing selector 203 selects, based upon the data on common handling, as obtained by evaluation by the frequency characteristics evaluators 202*a* to 202*e* and the target bit rate for encoding, such frequency range for which the absolute level of the quantization noise generated by common handling becomes lower then the minimum audibility curve. This renders the quantization noise resulting from common handling inaudible. The results of selection are outputted at an output terminal 204 and thence supplied to the common handling data extractors 103*a* to 103*e* and the common handling data formulator 104. The data on common handling, outputted at the output terminal 124, is outputted in terms of a pre-set frame, such as a sound frame, as a unit.

With the above-described encoder of the present embodiment, an alienated hearing sensation otherwise invoked by common handling may be reduced by selecting the common handling frequency exploiting data characteristics.

The common handling technique carried out by the common handling processing selector 203 may be changed between sound frames as pre-set frames. Thus, by selecting the optimum common-handling frequency range from one sound frame to another, it becomes possible to suppress changes in the sound field otherwise produced by common handling.

It is also possible for plural selections of common handling processing in one sound frame, as shown in FIG. 22. For example, if the frequency range for which the above-mentioned absolute level becomes lower than the minimum audibility curve is enhanced by independently encoding one or plural channels, without encoding in common, in a particular frequency range, common handling may be rendered more effective by effecting common handling processing in which the combinations of the channels handled in common in the pre-set frequency range are changed. Alternatively, it is possible for plural combinations of common handling simultaneously in a particular frequency range. For example, in the case of data in which it is more effective to separately handle the forward route channels and the backward route channels (surround channels), plural common channels having the same or different common-handled frequency ranges may be formulated for effecting common handling suited to data characteristics.

The above-described encoding and decoding methods of the present invention may be applied not only to the ATRAC system described in the embodiments but also to any other encoding system, above all, the encoding system in which time-domain signals are transformed by orthogonal transform into the frequency-domain signals.

What is claimed is:

1. An encoding method for encoding digital signals of plural channels, comprising the steps of:

handling in common the digital signals of at least a part of the plural channels to generate a common digital signal;

altering combinations of channels handled in common based upon at least one of frequency characteristics of the digital signals and a targeted playback environment;

outputting parameter information specifying the combinations of the channels handled in common;

encoding the common digital signal; and multiplexing the parameter information and the encoded common digital signal.

2. The encoding method of claim 1, wherein the step of encoding the common digital signal comprises the step of:

adaptively altering processing based upon at least one of contents of the digital signals and an advisable playback environment.

3. The encoding method of claim 2, wherein the step of adaptively altering the processing is performed on the basis of a pre-set time frame as a unit.

4. The encoding method of claim 1, wherein the step of altering the combinations of channels handled in common is performed on the basis of a pre-set time frame as a unit.

5. The encoding method of claim 4, wherein a plurality of the combinations of the channels handled in common are used in one frame.

6. The encoding method of claim 1, wherein the common digital signal is a digital signal of one channel split and arrayed in at least two channels.

7. The encoding method of claim 1, wherein, for at least one of the digital signals of plural channels, information for regenerating the pre-common-handling signal is determined and the information for regenerating is included in the information concerning common handling.

8. An encoding apparatus for encoding digital signals of plural channels, comprising:

means for handling in common the digital signals of at least a part of the plural channels to generate a common digital signal;

means for altering combinations of channels handled in common based upon at least one of frequency characteristics of the digital signals and a targeted playback environment;

means for outputting parameter information specifying the combinations of the channels handled in common;

means for encoding the common digital signal; and means for multiplexing the parameter information and the encoded common digital signal.

9. The encoding apparatus of claim 8, wherein said means for encoding alter processing based upon at least one of contents of the digital signals and an advisable playback environment.

10. The encoding apparatus of in claim 8, wherein said means for encoding controls the altering of the combinations of the channels handled in common from one pre-set frame to another.

11. The encoding apparatus of claim 10, wherein said means for encoding means employ different types of combinations of channels to be handled in common in one pre-set frame.

12. The encoding apparatus as claimed in claim 8, wherein said means for encoding means controls the altering of the combinations of the processing performed on signals to be handled in common from one pre-set frame to another.

13. The encoding apparatus of claim 8, wherein said means for encoding split and array the digital signals of an arbitrary channel among plural channels to be handled in common.

14. The encoding apparatus as claimed in claim 8, wherein said means for encoding analyzes information for regenerating the precommon-handling signals for at least a part of the digital signals of plural channels to be handled in common and includes said information for regenerating in the information on common handling.

15. A decoding apparatus for decoding encoded digital signals using parameters for encoding, said encoded digital signals being signals in which at least a part of digital signals of plural channels are handled as one or more common signals, with combinations of channels for common handling being altered in dependence upon at least one of frequency characteristics of the digital signals and a targeted playback environment, comprising:

decoding means for decoding the common signals, distributing means for distributing the decoded common signals in dependence upon the combinations of common handling, and decoding means for restoring the decoded common signals of plural channels based upon the signals distributed and handled in common.

16. The decoding apparatus of claim 15, wherein said decoding means alters the processing depending upon at least one of the contents of the digital signals and the advisable playback environment.

17. The decoding apparatus of in claim 15, wherein said decoding means decodes encoded signals in which plural types of combinations of the channels handled in common are used a plurality of number of times in a same pre-set frame.

18. The decoding apparatus of claim 17, wherein said decoding means adjusts the signals of respective channels using information for regenerating pre-common-handling signals contained in the information on common handling.

19. The decoding apparatus of claim 15, wherein said decoding means decodes split and arrayed signals of an arbitrary channel among encoded plural common signals.

20. A recording medium having recorded thereon such a signal in which part or all of digital signals of plural channels are handled as one or more encoded common signals, with combinations of channels for common handling being altered in dependence upon frequency characteristics of the digital signals and a targeted playback environment, parameter information specifying the combinations of channels to be handled in common, and an encoded signal other than the common signals and the parameter information for encoding are recorded along with the parameter information concerning the encoding.

21. The recording medium as claimed in claim 20, wherein the recording medium is one of is an optical disc and a motion picture film.

22. A recording medium having encoded digital signals recorded thereon, the recording medium being prepared by the steps of:

handling in common the digital signals of at least a part of plural channels to generate a common digital signal;

altering combinations of channels handled in common based upon at least one of frequency characteristics of the digital signals or a targeted playback environment;

outputting parameter information specifying the combinations of the channels handled in common;

encoding the common digital signal;

multiplexing the parameter information and the encoded common digital signal; and recording the multiplexed parameter information and the encoded common digital signal onto the recording medium.

23. The recording medium of claim 22, wherein the step of encoding the common digital signal comprises the step of:

adaptively altering processing based upon at least one of contents of the digital signals and an advisable playback environment.

24. The recording medium of claim 23, wherein the step of adaptively altering the processing is performed on the basis of a pre-set time frame as a unit.

25. The recording medium of claim 23, wherein, for at least one of the digital signals of plural channels, information for regenerating the pre-common-handling signal is determined and the information for regenerating is included in the information concerning common handling.

26. The recording medium of claim 22, wherein the step of altering the combinations of channels handled in common is performed on the basis of a pre-set time frame as a unit.

27. The recording medium of claim 26, wherein a plurality of the combinations of the channels handled in common are used in one frame.

28. The recording medium of claim 22, wherein the common digital signal is a digital signal of one channel split and arrayed in at least two channels.

* * * * *